United States Patent [19]

Yamamoto et al.

[11] Patent Number: 6,085,286
[45] Date of Patent: Jul. 4, 2000

[54] CACHE CONTROL METHOD AND APPARATUS

[75] Inventors: Akira Yamamoto, Sagamihara; Shigeo Homma, Odawara; Yoshihiro Asaka, Hiratsuka; Yoshiaki Kuwahara, Odawara; Akira Kurano, Odawara; Masafumi Nozawa, Odawara; Hiroyuki Kitajima, Yokohama, all of Japan

[73] Assignee: Hitachi, Ltd., Tokyo, Japan

[21] Appl. No.: 09/217,371

[22] Filed: Dec. 21, 1998

Related U.S. Application Data

[62] Division of application No. 08/822,004, Mar. 24, 1997, abandoned, which is a continuation of application No. 08/530,711, Sep. 19, 1995, Pat. No. 5,694,576, which is a continuation of application No. 08/375,234, Jan. 19, 1995, Pat. No. 5,497,472, which is a continuation of application No. 07/625,154, Dec. 10, 1990, abandoned.

[30] Foreign Application Priority Data

Dec. 13, 1989 [JP] Japan .................................. 1-323396

[51] Int. Cl.⁷ ................................................... G06F 13/00
[52] U.S. Cl. ................................................................ 711/113
[58] Field of Search .............................................. 711/113

[56] References Cited

U.S. PATENT DOCUMENTS

| | | | |
|---|---|---|---|
| 4,075,686 | 2/1978 | Calle et al. .............................. | 711/138 |
| 4,078,254 | 3/1978 | Beausoleil et al. ...................... | 711/122 |
| 4,084,231 | 4/1978 | Capozzi et al. .......................... | 711/117 |
| 4,084,234 | 4/1978 | Calle et al. .............................. | 711/118 |
| 4,268,907 | 5/1981 | Porter et al. ............................ | 711/138 |
| 4,394,732 | 7/1983 | Swenson ................................. | 711/113 |
| 4,394,733 | 7/1983 | Swenson ..................................... | 711/3 |
| 4,423,479 | 12/1983 | Hanson et al. ........................... | 711/113 |
| 4,468,730 | 8/1984 | Dodd et al. ............................... | 711/113 |
| 4,490,782 | 12/1984 | Dixon et al. .............................. | 711/136 |
| 4,500,954 | 2/1985 | Duke et al. ............................... | 711/138 |
| 4,593,354 | 6/1986 | Ushiro ......................................... | 714/48 |
| 4,603,380 | 7/1986 | Easton et al. ............................ | 711/113 |
| 4,669,043 | 5/1987 | Kaplinsky ..................................... | 711/3 |
| 4,800,483 | 1/1989 | Yamamoto et al. ..................... | 711/126 |
| 4,870,565 | 9/1989 | Yamamoto et al. ..................... | 711/113 |
| 4,884,197 | 11/1989 | Sachs et al. .............................. | 711/123 |
| 4,916,605 | 4/1990 | Beardsley et al. ....................... | 711/162 |
| 4,920,478 | 4/1990 | Furuya et al. ........................... | 711/136 |
| 4,933,835 | 6/1990 | Sachs et al. .............................. | 711/123 |
| 5,025,365 | 6/1991 | Mathur et al. ........................... | 711/121 |

(List continued on next page.)

FOREIGN PATENT DOCUMENTS

| | | |
|---|---|---|
| 55-157053 | 12/1980 | Japan . |
| 59-135563 | 8/1984 | Japan . |

OTHER PUBLICATIONS

English Abstract of JP63–1323354A; Fujitsu Ltd., Jun. 4, 1988.

English Abstract of JP1–113844A; NEC Corp., May 2, 1989.

(List continued on next page.)

*Primary Examiner*—David L. Robertson
*Attorney, Agent, or Firm*—Beall Law Offices

[57] ABSTRACT

In an information processing system having a data processing apparatus, a control unit for a cache memory, and a storage unit for storing a record, respectively interconnected together, wherein when the control unit receives from the data processing apparatus a write request for a record to be written and if the record to be written is not being stored in the cache memory, the control unit receives a data to be written in the object record from the data processing apparatus and stores the received data in the cache memory. After notifying the data processing apparatus of a completion of a data write process, the control unit checks if the object record in which the data stored in the cache memory is being stored in the storage unit, if the object record is being stored in the storage unit, the data in the cache memory is written in the storage unit, and if not, the data in the cache memory is not written and such effect is notified to the data processing apparatus.

4 Claims, 34 Drawing Sheets

U.S. PATENT DOCUMENTS

| | | | |
|---|---|---|---|
| 5,025,366 | 6/1991 | Baror | 711/128 |
| 5,045,998 | 9/1991 | Begun et al. | 710/127 |
| 5,091,846 | 2/1992 | Sachs et al. | 711/130 |
| 5,091,850 | 2/1992 | Culley | 711/3 |
| 5,097,532 | 3/1992 | Borup et al. | 711/144 |
| 5,097,533 | 3/1992 | Burger et al. | 709/302 |
| 5,163,142 | 11/1992 | Mageau | 711/142 |
| 5,241,666 | 8/1993 | Idleman et al. | 710/52 |
| 5,313,613 | 5/1994 | Gregor | 711/128 |
| 5,347,642 | 9/1994 | Barratt | 711/113 |
| 5,371,855 | 12/1994 | Idleman et al. | 711/113 |
| 5,404,487 | 4/1995 | Murata et al. | 711/113 |
| 5,446,861 | 8/1995 | Idleman et al. | 711/100 |
| 5,497,472 | 3/1996 | Yamamoto et al. | 711/100 |
| 5,694,576 | 12/1997 | Yamamoto et al. | 711/154 |

OTHER PUBLICATIONS

J. Menon et al, "The IBM 3990 Disk Cache," Thirty–Third IEEE Computer Society International Conference, Feb. 29–Mar. 4, 1988, pp. 146–151.

T. Miyachi et al, "Performance Evaluation for Memory Subsystem of Hierarchical Disk–Cache," Systems and Computers in Japan, vol. 17, No. 7, 1986, pp. 86–94.

S. Fuld, "The Amperif Cache Disk System," Thirty–Third IEEE Computer Society International Conference, Feb. 29–Mar. 4, 1988, pp. 156–157.

M. Young, "Controllers Wring Peak Performance Out of Disk Drives," Computer Design, May 1985, pp. 119–127.

M. Nelson et al, "Caching in the Sprite Network File System," ACM Transactions on Computer Systems, vol. 6, No. 1, Feb. 1988, pp. 134–154.

Busch J.R. et al, "Disc caching in the system processing units of the HP 3000 family of computers", Hewlett–Packard Journal, Amstelveen, Netherlands, vol. 36, No. 2, Feb. 1985, pp. 21–39.

T. Tokunaga et al, "Integrated disk cache system with file adaptive control", Proceedings of Distributed Computing, COMPTON 80, Twenty–first IEEE Computer Society International Conference, Washington, DC Sep. 23–25, 1980, vol. 21, pp. 412–416.

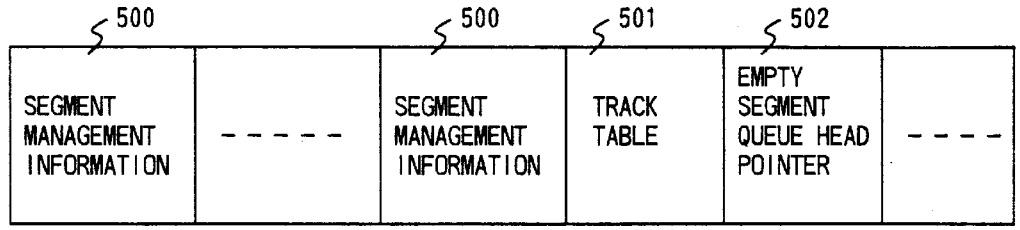
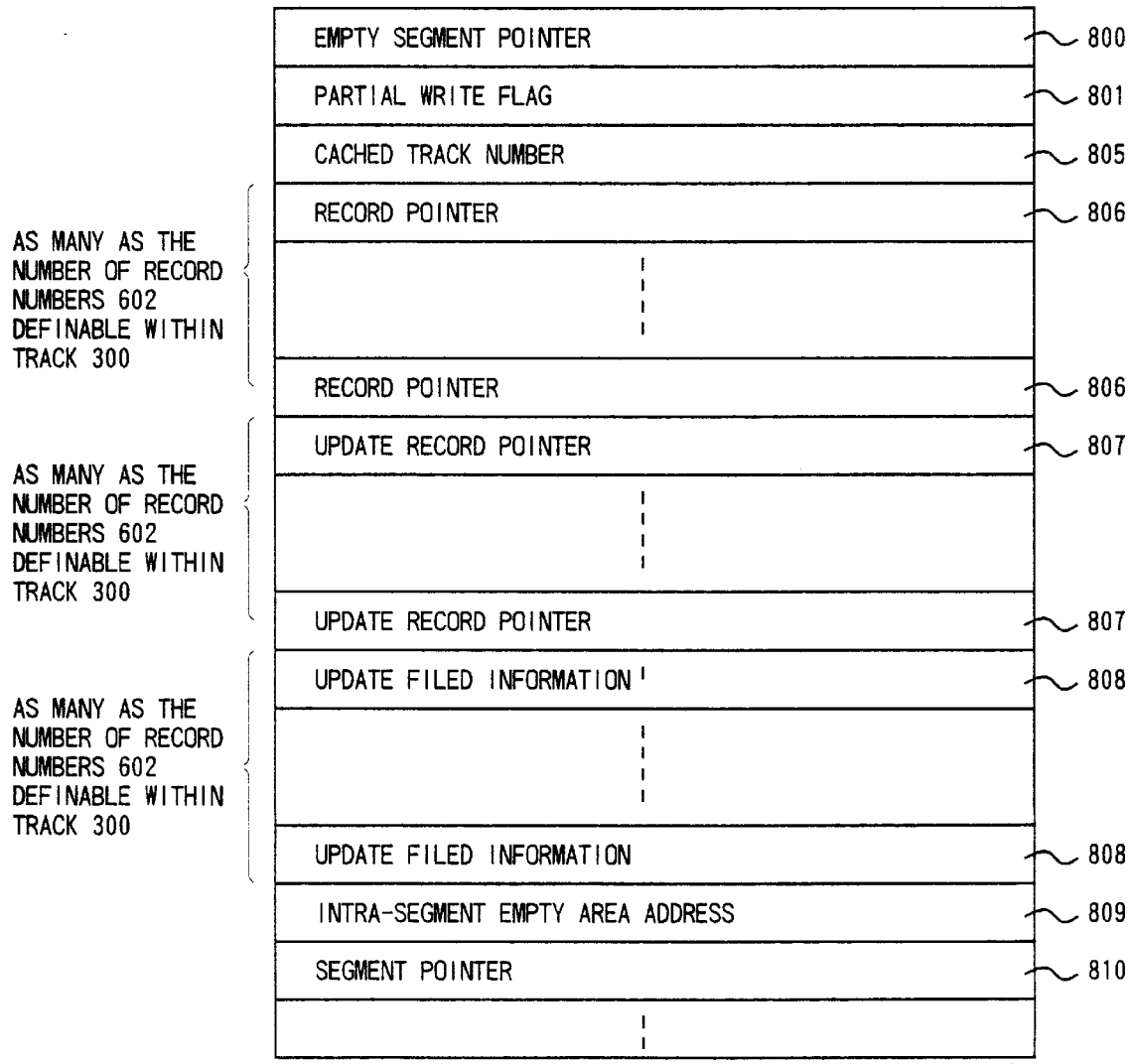

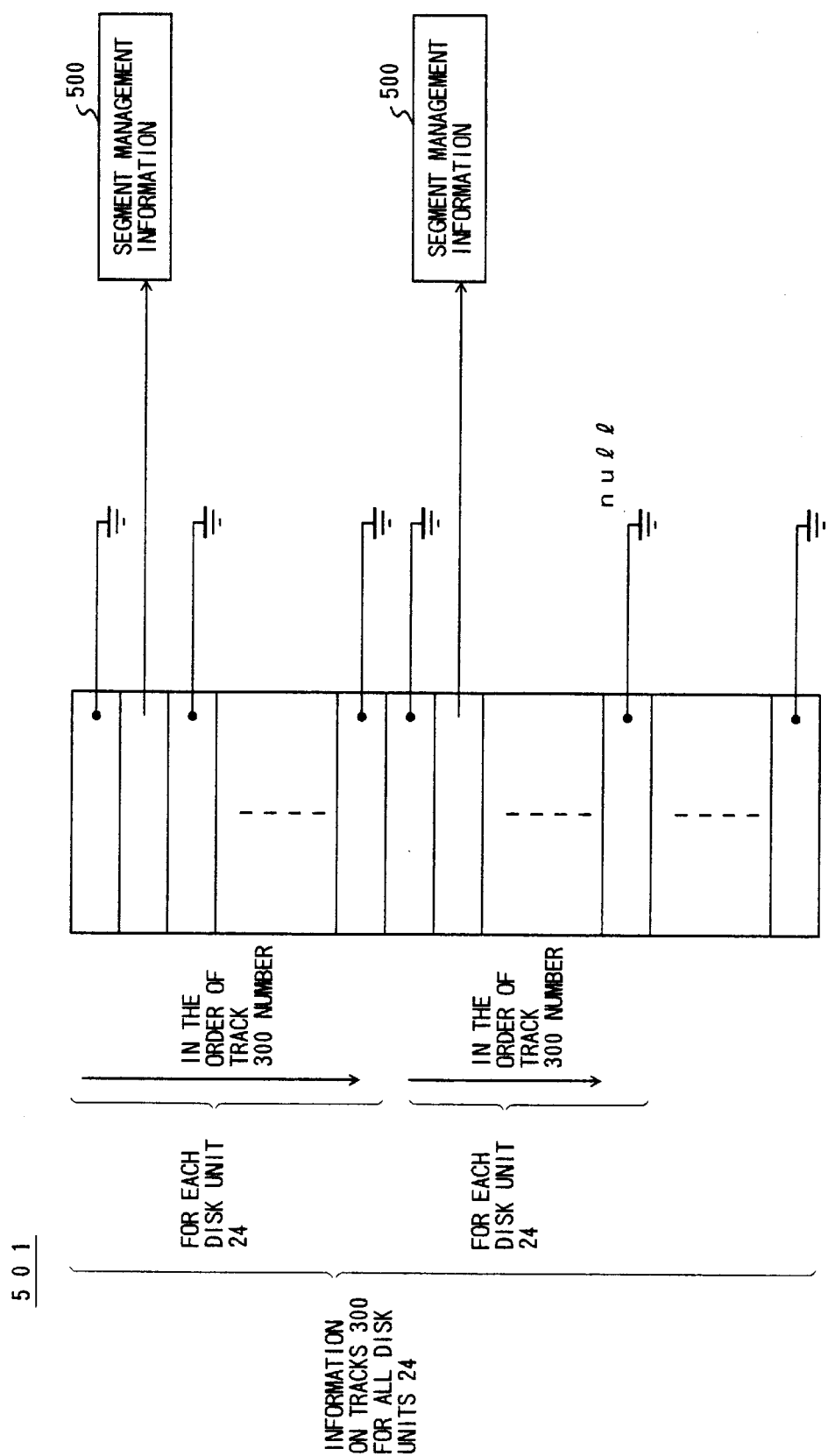

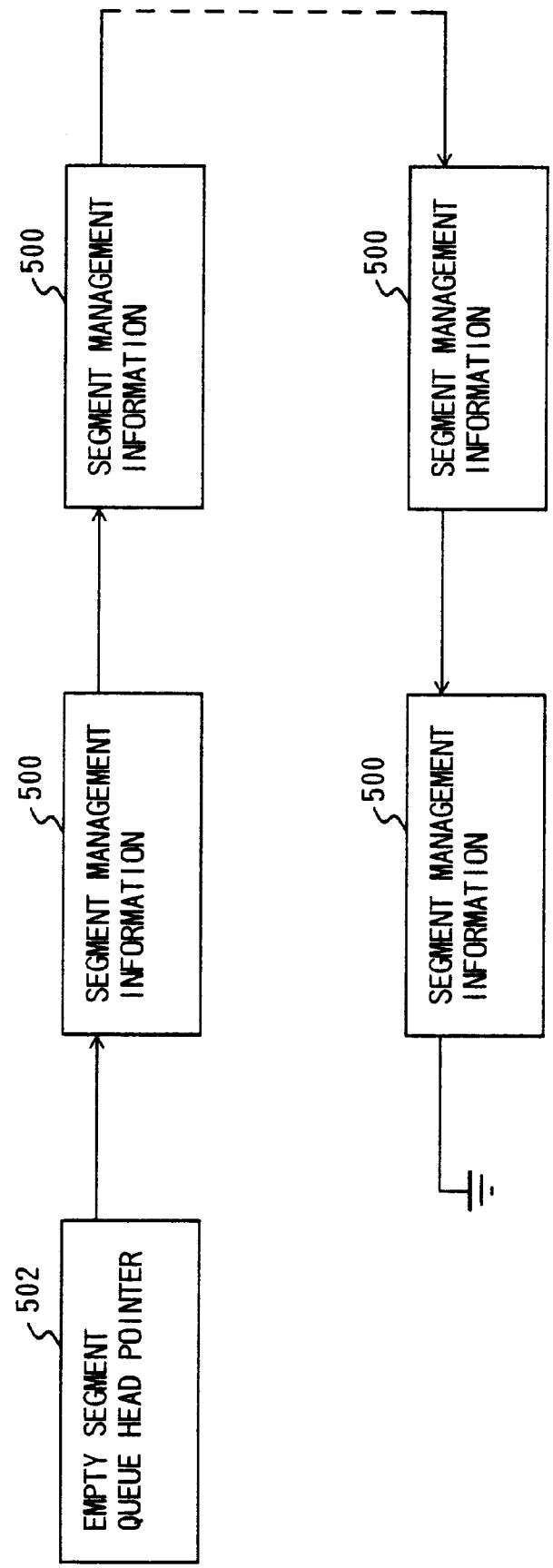

FIG. 27

500 SEGMENT MANAGEMENT INFORMATION

AS MANY AS THE NUMBER OF RECORD NUMBERS 602 DEFINABLE WITHIN TRACK 300

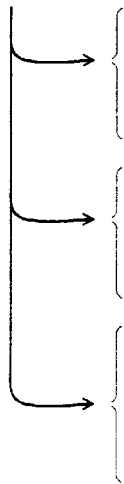

| EMPTY SEGMENT POINTER | 800 |
| --- | --- |
| PARTIAL WRITE FLAG | 801 |
| CACHE TRACK NUMBER | 805 |
| RECORD POINTER | 806 |
| ⋮ | |
| RECORD POINTER | 806 |
| UPDATE RECORD POINTER | 807 |
| ⋮ | |
| UPDATE RECORD POINTER | 807 |
| UPDATE FIELD INFORMATION | 808 |
| ⋮ | |
| UPDATE FIELD INFORMATION | 808 |
| INTRA-SEGMENT EMPTY AREA ADDRESS | 809 |
| SEGMENT POINTER | 810 |
| WRITE POSITION CALCULATION POSSIBLE BIT | 2200 |
| FIXED DATA FIELD LENGTH | 2201 |
| ⋮ | |

FIG. 28

1100 WRITE AFTER INFORMATION

| WRITE AFTER PROCESSING FLAG | 1200 |
| --- | --- |
| WRITE AFTER SEGMENT POINTER | 1202 |
| RECORD NUMBER INCONSISTENT INFORMATION | 1203 |
| FIELD LENGTH INCONSISTENT INFORMATION | 1204 |
| WRITE AFTER START RECORD NUMBER | 2300 |
| RECORD PHYSICAL POSITION INCONSISTENT INFORMATION | 2301 |

FIG. 36

WRITE AFTER MEMORY
27

FOR EACH DISK UNIT 24:
- WRITE AFTER INFORMATION — 1100
- ⋮
- WRITE AFTER INFORMATION — 1100

FOR EACH DISK UNIT 24:
- WRITE AFTER TRACK INFORMATION b — 2800
- ⋮
- WRITE AFTER TRACK INFORMATION b — 2800

FIG. 37

WRITE AFTER TRACK INFORMATION
2800

FOR EACH TRACK 300:
- TRACK STATE b — 2900
- ⋮
- TRACK STATE b — 2900

FOR EACH TRACK 300:
- FIXED DATA LENGTH INFORMATION — 2901
- ⋮
- FIXED DATA LENGTH INFORMATION — 2901

AS MANY AS THE NUMBER OF RECORD NUMBERS 602 DEFINABLE WITHIN TRACK 300

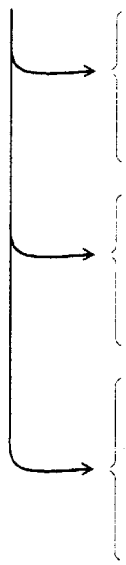

| WRITE AFTER EXECUTING FLAG | 800 |
| PARTIAL WRITE FLAG | 801 |
| CACHED TRACK NUMBER | 805 |
| RECORD POINTER | 806 |
| ⋮ | |
| RECORD POINTER | 806 |
| UPDATE RECORD POINTER | 807 |
| ⋮ | |
| UPDATE RECORD POINTER | 807 |
| UPDATE FIELD INFORMATION | 808 |
| ⋮ | |
| UPDATE FIELD INFORMATION | 808 |
| INTRA − SEGMENT EMPTY AREA ADDRESS | 809 |
| SEGMENT POINTER | 810 |
| WRITE POSITION CALCULATION POSSIBLE BIT | 2200 |
| FIXED DATA FIELD LENGTH | 2201 |
| INTRA − CACHE MAXIMUM RECORD NUMBER | 3700 |
| ⋮ | |

CACHE CONTROL METHOD AND APPARATUS

This is a divisional application of U.S. Ser. No. 08/822,004 filed Mar. 24, 1997, now abandoned, which is a continuation application of U.S. Ser. No. 08/530,711, filed Sep. 19, 1995 (now U.S. Pat. No. 5,694,576 issued Dec. 2, 1997), which is a continuation of Ser. No. 08/375,234, filed Jan. 19, 1995 (now U.S. Pat. No. 5,497,472 issued Mar. 5, 1996), which is a continuation application of Ser. No. 07/625,154, filed Dec. 10, 1990, now abandoned.

BACKGROUND OF THE INVENTION

The present invention relates to a cache control method capable of speeding up the write process for writing data from a data processing apparatus into a storage unit by using a cache memory, and a cache control apparatus suitable for practicing the cache control method as above.

For use with information processing systems having a data processing apparatus, a control unit for a cache memory, and a storage unit, respectively interconnected together, there has been proposed the method of controlling the writing of data from the data processing apparatus into the storage unit, as described for example in Japanese Laid-open publication JP-A-55-157053.

According to a first control method described in this related art, a write process by the data processing apparatus is terminated when data have been written in a cache memory. The data stored in the cache memory are written in the storage unit later at a proper time. This write process is called a write-after or write back process. Data written in the cache memory and not in the storage unit are called write-after data. In the above-mentioned Publication JP-A-55-157053, however, the technology of the manner of how data received from the data processing unit are written in the storage unit is not disclosed.

According to a second control method, the write process by the data processing apparatus is terminated only when data have been written in the storage unit.

According to a third control method, write data supplied from the data processing apparatus are classified into permanent write data and temporary write data. The write process for the permanent write data by the data processing apparatus is terminated only when the data have been written in the storage unit. On the other hand, the write process for the temporary data by the data processing apparatus is terminated when the data have been written in the cache memory. The temporary data are not intended to be written into the storage unit.

Of the three control methods, the second control method does not use a cache memory but directly access the storage unit, and the degree of using the cache memory is considerably limited in the third control method. In view of this, only the first control method is substantially a cache control method that is capable of speeding up the write process.

However, it is difficult to apply the first cache control method when data is written by the data processing apparatus into a record in the storage unit, if the record is not stored in the cache memory at that time.

The reason for this is that if, at the time of writing data from the data processing apparatus, the corresponding record is not stored in the cache memory, then there is a possibility that the record having a record number designated by the data processing apparatus is not stored in the storage unit. Furthermore, if the storage unit stores a duplicate of a record having a record number designated by the data processing apparatus, it is not possible to determine in which record the data are to be written, thereby preventing the correct write-after process.

Thus, the above cache control method is difficult to implement if a record to be written is not stored in the cache memory at the time of writing data from the data processing apparatus. Speeding up the write process is thus impossible.

There is disclosed in JP-A-59-135563 a technique for a disk controller with a cache memory and a nonvolatile memory. In JP-A-59-15563, the disk controller writes the data received from a data processing unit to both the cache memory and the nonvolatile memory. If the cache memory malfunctions before the write-after data in the cache memory are written to the disk unit, the write-after data are stored in the nonvolatile memory. Therefore, a highly reliable write-after process can be realized. However, no consideration has been paid to the case where a record of a write request issued by the data processing unit does not exist in the cache memory.

As described above, with the conventional cache control method, the speed of the write process can be increased when the record corresponding to the data being written by the data processing apparatus is stored in the cache memory at the time of data write, because the write process can be terminated when the data have been stored in the cache memory. However, if a record corresponding to the data of the data write request is not being stored in the cache memory at the time of data write, it is hard to speed up the write process.

SUMMARY OF THE INVENTION

It is a first object of this invention to provide a cache control method capable of speeding up the write process, even if a record to be written is not being stored in the cache memory at the time of the writing of data from a data processing apparatus, by terminating the write process when the data have been stored in the cache memory.

This invention also aims at providing a cache control apparatus suitable for practicing the cache control method of the invention.

In order to further speed up the write process, it is necessary to efficiently execute the write process of the write-after data in a storage unit. To this end, it becomes necessary, as will be later described, to know the physical position of the storage unit relative to the write-after data.

It is therefore a second object of the invention to provide a cache control method capable of calculating the physical position of the storage unit relative to the write-after data when the data have been stored in the cache memory, even if a record to be written by the data processor is not stored in the cache memory.

According to the present invention, the following three cache control methods are provided in order to achieve the first object of speeding up the write process even if a record to be written is not being stored in the cache memory.

According to the first cache control method for a control unit for a cache memory connected with a storage unit for storing a record, the control unit (a) receives from the data processing apparatus a write request for a record to be written; (b) if the record to be written is not being stored in the cache memory, receives data to be written in the object record from the data processing apparatus; (c) stores the received data in the cache memory; (d) notifies the data processing apparatus of a completion of the data write process; (e) checks if the object record in which the data stored in the cache memory is stored in the storage unit; and (f) if the record is stored, writes the data stored in the cache memory in the object record of the storage unit, and if not, the data stored in the cache memory are not written and such a result is notified to the data processing apparatus.

According to the second cache control method for a control unit with a cache memory connected with a storage unit for storing a record having a control field inclusive of a record number, all of which are respectively interconnected together, the control unit (a) receives from the data processing apparatus a write request including record information for designating a record to be written, field information for designating a field to be written in the record, and process mode information for designating a process mode to be executed when the record to be written is not stored in the cache memory; (b) receives from the data processing apparatus data to be written in the designated field in accordance with the process mode designated by the process mode information, if the record to be written by the record information is not stored in the cache memory and if the field to be written by the field information does not contain the control field; (c) stores the data in the cache memory; and (d) notifies the data processing apparatus of the completion of a write process.

According to the third cache control method for a control unit with a cache memory connected with a storage unit for storing a record having a plurality of physical areas for storing a record having a control field inclusive of a record number, the control unit holds, for each physical area, record format information indicating whether there is a duplicate record number of the record in the physical area, (a) receives from the data processing apparatus a write request including record information for designating a record to be written, and field information for designating a field to be written in the record; (b) receives from the data processing apparatus data to be written in the field designated by the field information if the record to be written by the record information is not stored in the cache memory, if the field to be written by the field information does not contain the control field, and if the record format is satisfied; (c) stores the data in the cache memory; and (d) notifies the data processing apparatus of the completion of a write process.

Next, the following two cache control methods are provided as the fourth and fifth cache control methods in order to achieve the second object of making it possible to calculate the physical position of a storage unit relative to the write-after data even when a record to be written is not stored in a cache memory.

According to the fourth cache control method of a control unit for a cache memory connected with a storage unit for storing a record having a plurality of physical areas for storing a record having a control field inclusive of a record number, the control unit (a) receives from the data processing apparatus a write request including record information for designating a record to be written, field information for designating a field to be written in the record, and record format information which indicates whether all of the following are satisfied: the record number of the record at the start of the physical area for storing records is "0" and the numbers of the following records are given in the ascending order each incremented by "one", each record has one field other than the control field, the length of the field other than the control field of each record having the record number 1 or larger is the same, and the field other than the control field of the record having the record number 0 has a predetermined length; (b) receives from the data processing apparatus data to be written in the designated field if the designated record is not being stored in the cache memory, if the designated field does not contain the control field, and if the record format is satisfied; (c) stores the data in the cache memory; and (d) notifies the data processing apparatus of the completion of a write process.

According to the fifth cache control method for a control unit for a cache memory connected with a storage unit for storing a record having a plurality of physical areas for storing a record having a control field inclusive of a record number, the control unit holds, in each physical area, record format information indicating whether all of the following are satisfied: whether the record number of the record at the start of the physical area for storing records is "0" and the numbers of following records are given in the ascending order each incremented by "one", each record has one field other than the control field, the length of the field other than the control field of each record having the record number 1 or larger is the same, and the field other than the control field of the record having the record number 0 has a predetermined length; (a) receives from the data processing apparatus a write request including record information for designating a record to be written, and field information for designating a field to be written in the record; (b) receives from the data processing apparatus data to be written in the designated field if the designated record is not being stored in the cache memory, if the designated field does not contain the control field, and if the record format is satisfied; (c) stores the data in the cache memory; and (d) notifies the data processing apparatus of the completion of a write process.

The present invention all contemplates the cache control apparatus provided with means for practicing the first to fifth cache control methods.

According to the first cache control method of this invention, even if data to be written and supplied from the data processing apparatus are not being stored in the cache memory, the data are stored in the cache memory and the completion of the write process is forwarded to the data processing apparatus at this stage. In the above manner, the write process can be sped up irrespective of whether or not data from the data processing apparatus are being stored in the cache memory.

According to the second and fourth cache control methods of this invention, upon reception of a write request from the data processing apparatus, data to be written and supplied from the data processing apparatus are stored by a control unit in the cache memory even if the data are not being stored in the cache memory, and the control unit notifies the data processing apparatus at this stage of the completion of a write process.

According to the third and fifth cache control methods of this invention, if data to be written and supplied from the data processing apparatus are not being stored in the cache memory, the control unit checks if there is no duplicated record number in the storage unit, and then stores the data in the cache memory and announces a completion of the write process at this stage. Therefore, an occurrence of error in the case where the data stored in the cache memory are written to the storage unit can be avoided and the write process can be sped up. In order to check a duplicated record number, the data processing apparatus holds therein the information representing whether or not there is a duplicated record number in the storage unit.

According to the fourth and fifth cache control methods of this invention, the physical position of the storage unit relative to the write-after data can be calculated in accordance with such structural information as the ascending order of record numbers, thereby further improving the efficiency of the write process.

The cache control apparatus embodying the first to fifth cache control methods operate in the same manner as described above.

BRIEF DESCRIPTION OF THE DRAWINGS

FIG. 8 shows an example of the structure of the directory 28 according to the first embodiment of this invention;

FIG. 9 shows an example of the structure of the segment management information 500 according to the first embodiment of this invention;

FIG. 10 shows an example of the structure of a track table 501 according to the first embodiment of this invention;

FIG. 11 illustrates the empty segment queue head pointer 502 according to the first embodiment of this invention;

FIG. 27 shows an example of the structure of the segment management information 500 according to the third embodiment of this invention;

FIG. 28 shows an example of the structure of the write-after information 1100 according to the third embodiment of this invention;

FIG. 36 shows an example of the structure of the write-after memory 27 according to the fourth embodiment of this invention;

FIG. 37 shows an example of the structure of the write-after track information b 2800 according to the fourth embodiment of this invention;

FIG. 44 shows an example of the structure of the segment management information 500 according to a fifth embodiment of this invention.

DESCRIPTION OF THE PREFERRED EMBODIMENTS

Preferred embodiments of this invention will be described below.

The embodiments of this invention include first to fifth embodiments. The common elements thereto will first be described with reference to FIGS. 2 to 5.

Figure 2:
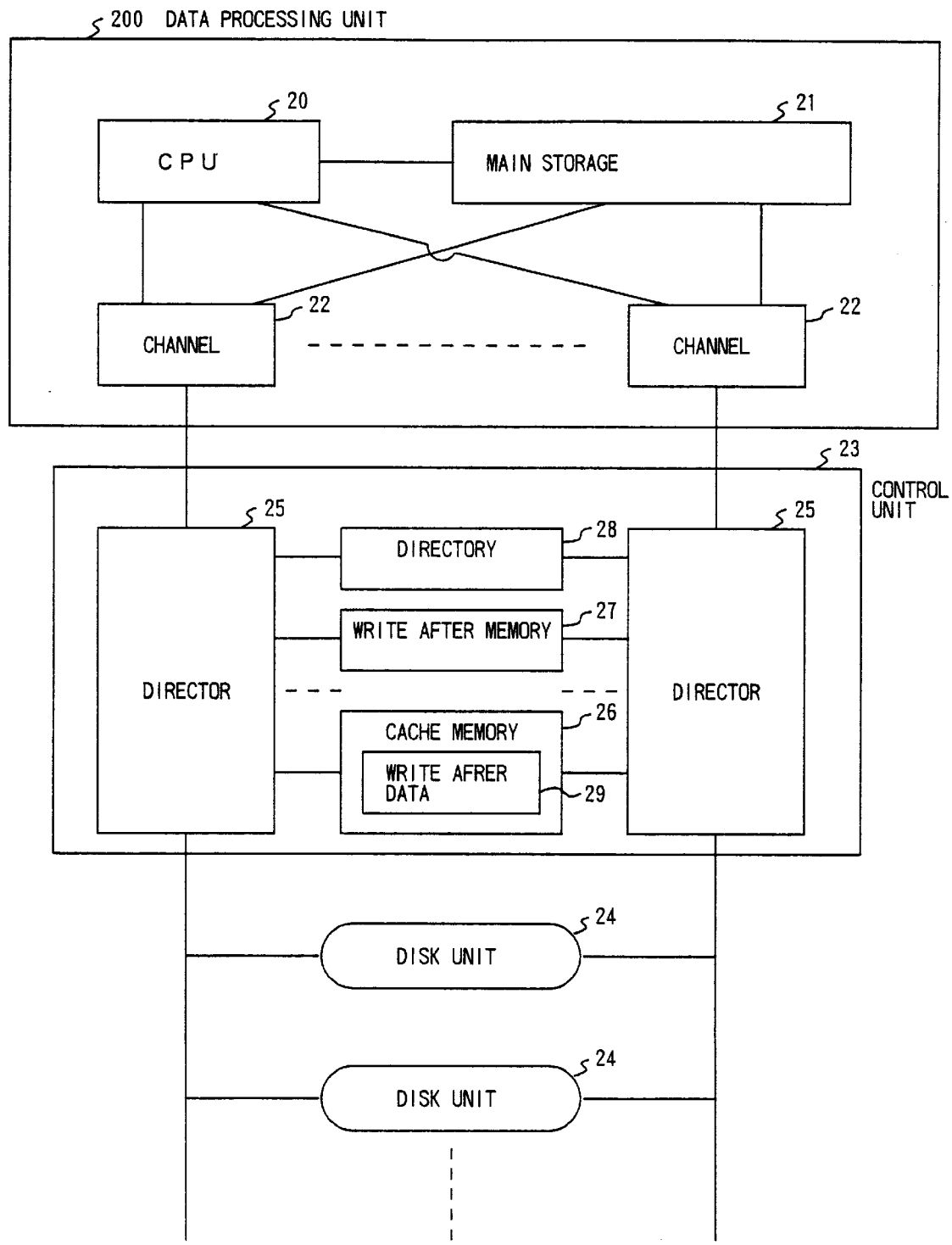
FIG. 2 is a block diagram of an information processing system according to the present invention.

FIG. 2 is a block diagram showing an information processing system embodying the present invention.

The information processing system is constructed of a data processing unit 200, a control unit 23, and one or more disk units 24, all operatively connected to each other.

The data processing unit 200 has a CPU 20, a main storage 21, and channels 22.

The control unit 23 has one or more directors 25, a cache memory 26, a write-after memory 27, and a directory 28.

The director 25 performs data transfer between the channel 22 and the disk unit 24, between the channel 22 and the cache memory 26, and between the cache memory 26 and the disk unit 24.

The cache memory 26 is loaded with the data of the disk unit 24 that are frequently accessed. This load process is executed by the director 25. Particular examples of such data include the data accessed in the past by CPU 20, the data stored in the disk unit 24 at areas near the data accessed by CPU 20, and other data.

The directory 28 stores management information for the cache memory 26.

Figure 3:
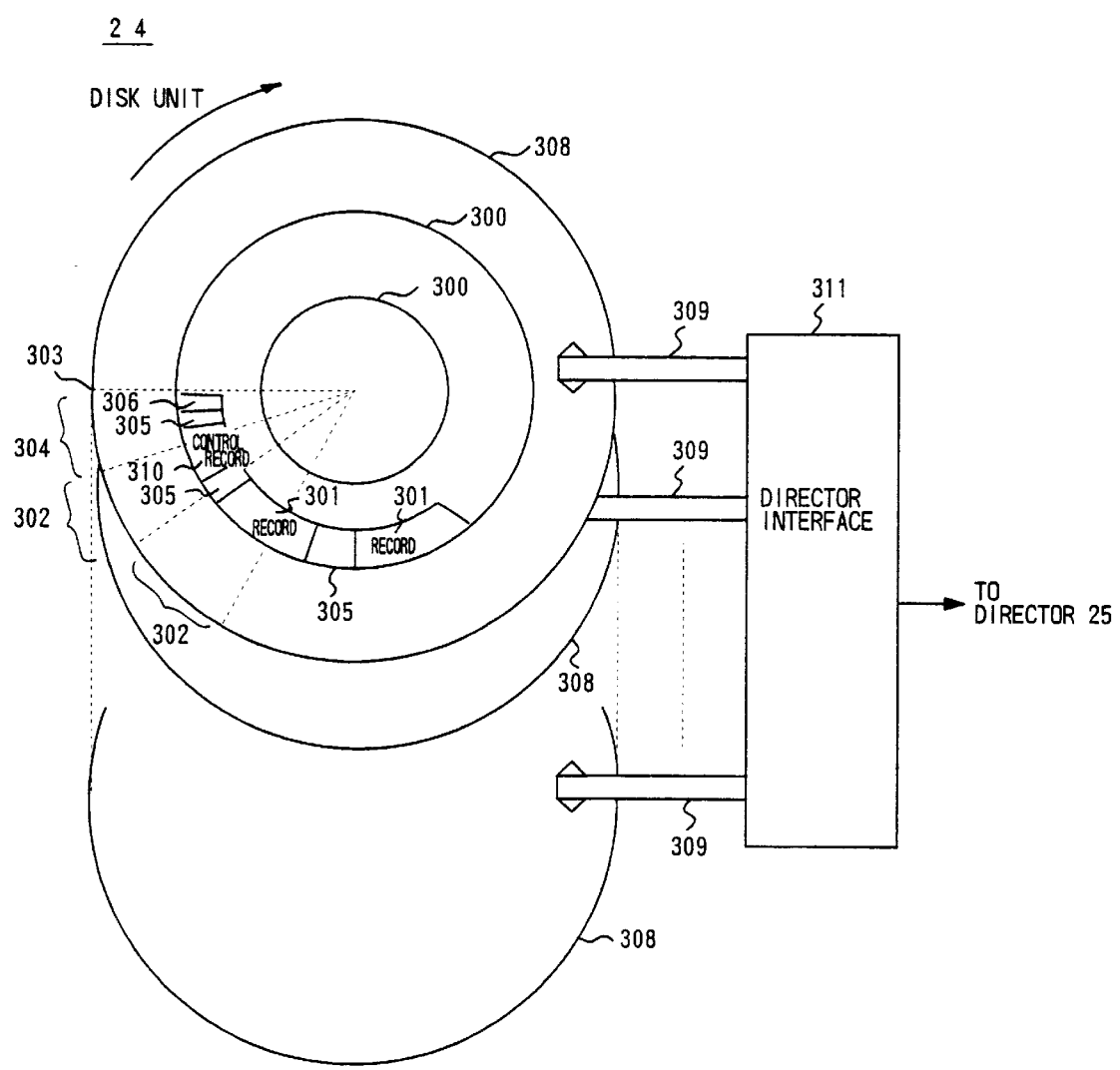
FIG. 3 shows an example of the structure of the disk unit 24.

The disk unit 24 has the structure as shown in FIG. 3. Each disk unit 24 has a plurality of disks 308, each disk being a medium for storing data. A read/write head 309 for reading/writing data relative to the disk 308 is provided for each disk 308.

A circular area accessible by the read/write head 309 while the disk 308 rotates once is called a track 300. A plurality of tracks 300 are formed on the disk 308. When the data are read from or written to the track 300, the read/write head 309 is moved to the position where the data can be read/written. This operation is called a seek operation. A request for such an operation is called a positioning request. A director interface 311 between the disk unit 24 and the director 25 controls the read/write head 309 in accordance with an instruction from the director 25.

Sectors 302 are areas formed on the disk 308 at predetermined angular intervals from a reference position 303 of the disk 308. This reference position 303 is called a home index 303. The sector 302 starting from the home index 303 is called a basic sector 304 (sector 0). The number of each sector 302 is incremented by one from the basic sector 304 in the direction opposite to the rotation of the disk 308.

The read/write head 309 identifies the sector 302 positioned under it.

Immediately after the home index 303, there is formed an area which stores control information for the track 300. This area is called a home address 306.

Each track 300 has one or more records 301. Each record 301 is a unit of data read from or written to the disk unit 24 by the director 25.

A gap 305 is formed between adjacent records 301. The gap 305 between the records 301 is called a gap a 305 in order to discriminate from a gap b 605 (refer to FIGS. 4 and 5) to be described later.

Each record 301 may have a different length. The length of each gap a is the same.

Generally, the record 301 immediately after the home address 306 stores not general data, but control data to be used by the CPU 20 side. Therefore, this record is called a control record 310.

Figure 4:
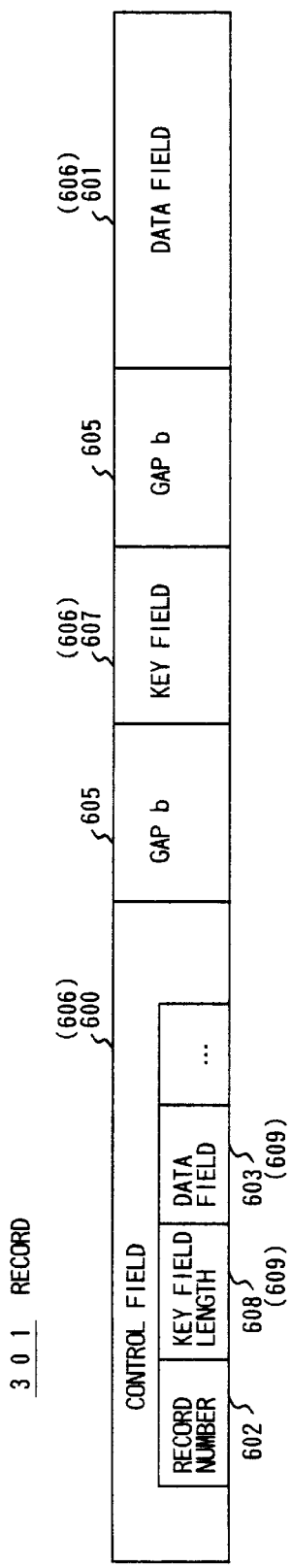
FIG. 4 shows an example of the structure of the record 301.
Figure 5:
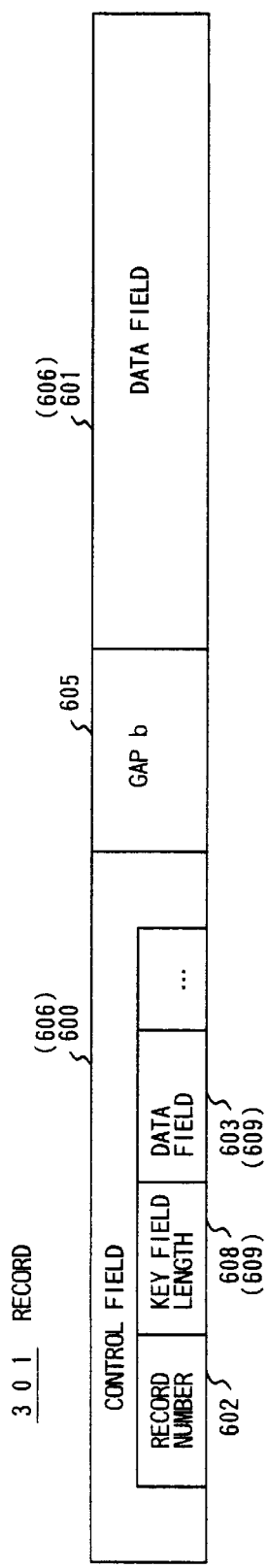
FIG. 5 shows an example of another structure of the record 301.

FIGS. 4 and 5 show examples of the structure of a record 301. In the example shown in FIG. 4, the record 301 is constructed of three fields 606 including a control field 600, a key field 607, and a data field 601. In the example shown in FIG. 5, the record 301 is constructed of two fields 606 including a control field 600 and a data field 601.

A gap 605 is formed between the control field 600 and the key field 607, and between the key field 607 and the data field 601. This gap 605 is called the gap b 605. The length of each gap b 605 is the same.

The control field 600 records control information including a record number 602, a key field length 608, a data field length 603 and the like. The record number 602 is a discriminator for the record 301. The key field. length 608 and data field length 603 represent the length of the key field 607 and the data field 601, respectively. If the record 301 has no key field 607 as shown in FIG. 5, the key field length 608 is set to 0. The length of the control field 600 is generally fixed.

The data field 601 holds information to be processed by a program running in CPU 20.

The key field 607 holds key information which checks the right of access to the contents of the data field 601.

A write process generally includes a format write process and a partial write process. The former process is for altering all the fields 606 inclusive of the control field 600, and the latter process is for altering the fields excepting the control field 600. The execution frequency of the format write process is not so high and not necessary to speed up because it is executed only when a whole file is made for the first time. The execution frequency of the partial write process is high so that it should be sped up. Therefore, this invention mainly relates to a partial write.

The data field length 603 and key field length 608 are presented within the control field 600. Therefore, with the partial write process, the contents of the data field 601 and the key field 607 change, but the length in the control field 600 maintains unchanged.

The process outline of the present invention will be given.

Figure 45:
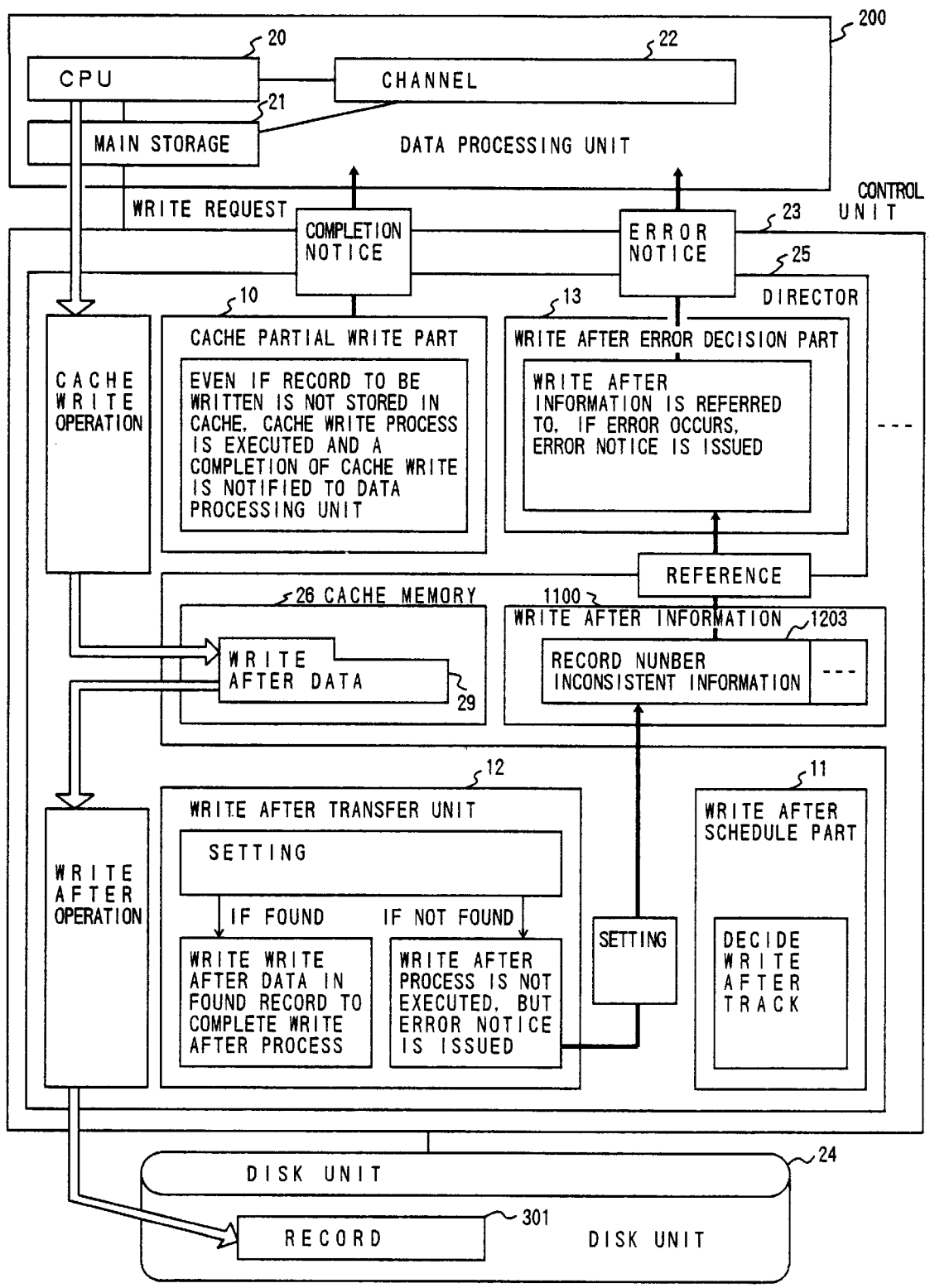
FIG. 45 illustrates the outline of this invention.

FIG. 45 shows the outline of the operation of each processing unit, i.e., the outline of this invention. A cache partial write part 10 first receives a partial write request from CPU 20 via the channel 22. In this case, even if a record to be written is not present in the cache memory 26 (even if a record 301 having a record number 602 designated by CPU 20 for data write is not present in the cache memory 26), the cache partial write part 10 executes the following cache write process. Namely, data to be written in the record 301 designated by CPU 20 are stored in the cache memory 25 as write-after data 29. After completion of data storage, a completion of the partial write request is notified to the CPU 20 side.

Next, a write-after schedule part 11 determines the track 300 of the disk unit 24 with respect to which the write-after process is to be executed, and issues a positioning request to the disk unit 24.

After completion of the positioning process, a write-after transfer part 12 finds a record 301 in which the write-after data 29 stored in the cache memory 26 are to be stored (i.e., the part 12 finds the record 301 having the record number 602 designated by CPU 20). If the record is found, there is executed the write-after process for writing the write-after data 29 in the record 301. If not, the write-after process is not executed, but "record number inconsistent" information 1203 in write-after information 1100 is set to thereby register an occurrence of an error.

Lastly, a write-after error decision part 13 refer to the "record number inconsistent" information 1203 to notify the CPU 20 that the record 301 to be written with the write-after data 29 was not found in the disk unit 24. In the following embodiments, the write-after error decision part 13 sends such an error notice to CPU 20 when the former receives a read/write request from the latter. However, the timings of giving such an error notice are not limited thereto, but other timings may also be used. For example, an error notice may be given to CPU 20 immediately after the write-after transfer part 12 sets the "record number inconsistent" information 1203 in the write-after information 1100.

Next, the first embodiment of this invention will be described with reference to FIGS. 1 and 6 to 18. In the first embodiment, if a record 301 to be written is not present in the cache memory 26, and only when the director 25 receives a particular process mode designated by CPU 20, the director 25 terminates the write process when the data have been written in the cache memory 26.

Figure 1:
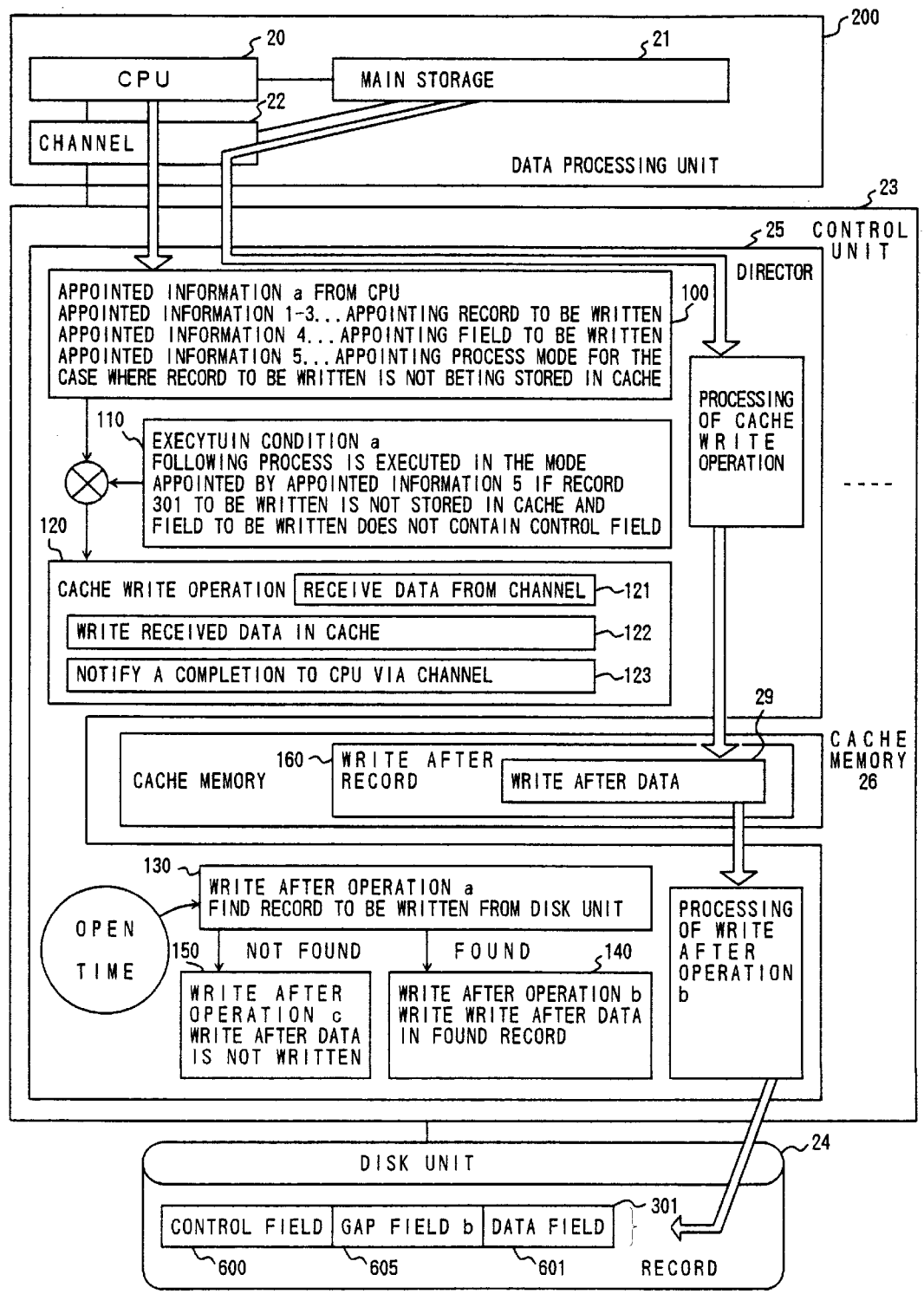
FIG. 1 is a block diagram of a control unit according to the first embodiment of this invention.

FIG. 1 is a diagram illustrating in detail the information processing system of the first embodiment.

The director 25 receives the following designated information a 100 from CPU 20 via the channel 22 during the course of executing the partial write process.

Designated Information 1 ... for designating the disk unit 24 and the track 300 storing the record 301 to be written.

Designated Information 2 ... for designating the sector 302 of the track 300 from which the record 301 to be written is searched.

Designated Information 3 ... for designating the record number 602 of the record 301 to be written.

Designated Information 4 ... for designating the field 606 to be written.

Designated Information 5 ... for designating a process mode when the record 301 to be written is not being stored in the cache memory 26. Namely, when CPU 20 recognizes that there is no duplicated record number 602 in the track 300 designated by the designated information 1, this process mode is designated for terminating the write process when the data have been written in the cache memory 26.

Thus, the execution condition a 110 of this cache write operation according to this invention is that the record 301 to be written is not being stored in the cache memory 26, the field to be written does not contain the control field 600, and the process mode designated by the designated information 5 has been received.

In the cache write operation 120, the director 25 receives data from the channel 22 (step 121), and writes the received data in the cache memory 26 (step 122). A notice of write process completion is given via the channel 22 to CPU 20 (step 123).

Data stored in the cache memory 26 and not written in the disk unit 24 is called write-after data 29.

The director 25 manages the record 301 which stores the write-after data 29, as a write-after record 160.

The director 25 writes the write-after data 29 in the disk unit 24 by using an idle time of the director 25. This operation is called a write-after operation.

In a write-after operation a 130, the director 25 finds the record 301 on the disk unit 24 where the write-after data 29 are written. Specifically, the director 25 finds the record 301 having the record number 602 designated by the designated information 3 within the track 300 of the disk unit 24 designated by the designated information 1 and 2.

If the object record 301 has been found, the director 25 executes a write-after operation b 140 to write the write-after data 29 in the record 301.

If the object record 301 is not found, the director 25 executes a write-after operation c 150 not to write the write-after data 29, and notifies the CPU 20 of such a situation as will be described later.

Figure 6:
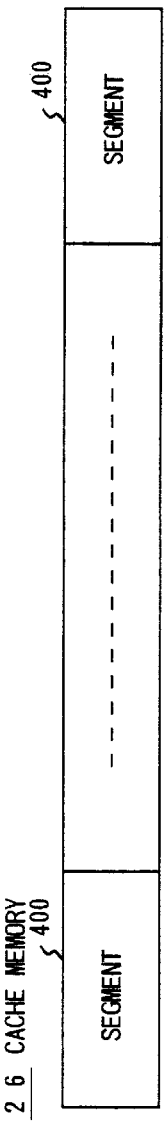
FIG. 6 shows an example of the structure of the cache memory 26 according to the first embodiment of this invention.

FIG. 6 shows the structure of the cache memory 26 of this embodiment.

The cache memory 26 is constructed of a number of segments 400.

Each segment 400 can store all records 301 of one track 300. A conventional method may be used as a method of determining which segment 400 is allocated to which track 300. An empty segment 400 may be present which has not been allocated with the track 300.

Figure 7:
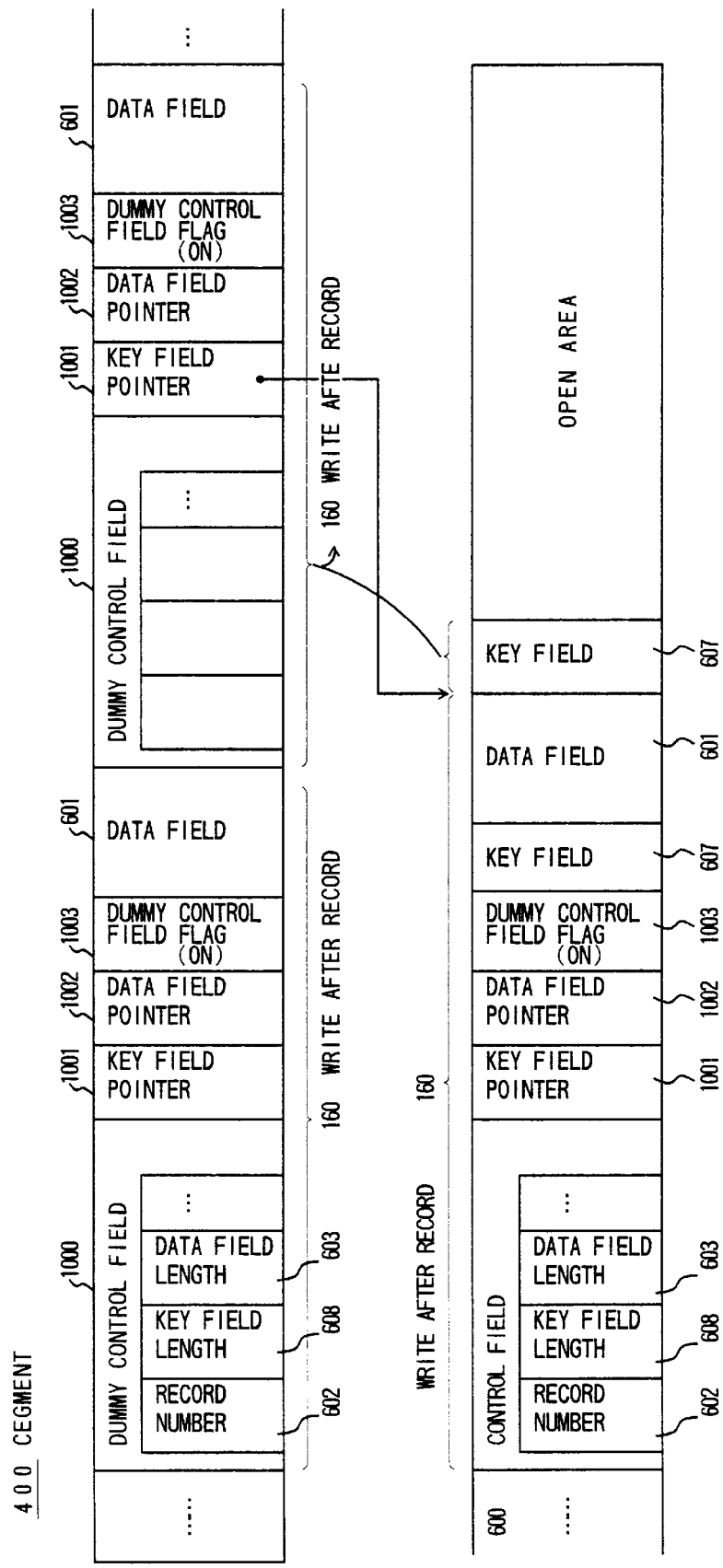
FIG. 7 shows an example of the structure of the segment according to the first embodiment of this invention.

FIG. 7 shows the storage format of the write-after data 160 within the segments 400.

Since the data in the control field 600 are not changed at the partial write process, the director 25 does not receive the control field 600 from the channel 22. Thus, if the record 301 to be written is not being stored in the cache memory 26 and the supplied data have been written, the director 25 forms a dummy control field 1000 in the cache memory 26.

The designated record number 602 from the channel 22 is stored in the dummy record field 1000. Also stored in the dummy record field 1000 is the length of the data to be written in the designated field 606 and supplied from the channel 22. If the contents of the key field 607 and the data field 601 are to be changed, the length of the data for the respective fields is set as the key field length 608 and data field length 603. If the contents of the data field 601 only are to be changed, 0 is set as the key field length 608. In the following description, the key field length 608 and data field length 603 are collectively called a field length 609.

For writing the write after record 160 in the record 301 of the disk unit 24, the director 25 determines whether or not the write-after process is to be executed by comparing the record number 602 and field length 609 in the control field 600 of the record 301 on the disk unit 24 with the corresponding record number 602 and field length 609 in the dummy control field 1000.

If the record 301 to be written is being stored in the cache memory 301, the control field 600 has been already stored in the segment 400 so that the dummy control field 1000 is not formed.

After the dummy control field 1000 or control field 600, there are stored a key field pointer 1001, a data field pointer 1002, and a dummy control field flag 1003.

The key field pointer 10001 and data field pointers 1002 are pointers to the key field 607 and data field 601 stored in the cache memory 26, respectively. The reason for providing these pointers is that there is a case where areas for storing one write-after record 160 are not consecutive. An example of such a case will be described in the following.

When the director 25 receives the partial write request for only the data field 601 of the record 301 not stored in the cache memory 26, an area for storing the key field 607 cannot be established because the length of the key field 607 cannot be known. Therefore, the key field length 608 is set to 0. Thereafter, it is assumed that there is received the partial write request for changing the contents of both the key field 607 and the data field 601. In this case, the length of the key field 607 is known so that the area for the key field 607 is established at this stage. Accordingly, as shown in FIG. 7, the area for the key field 607 is established at the position remote from the write-after record 160 containing the dummy control field 1000, so that the areas for storing one write-after record 160 are not contiguous.

The dummy control field flag 1003 is turned on when the director 25 has generated the dummy control field 1000, whereas it is turned off when the director 25 has loaded the record 301 from the disk unit 24 to the cache memory 26.

FIG. 8 shows information provided within the directory according to this embodiment. The information includes segment management information 500, a track table 501, and an empty segment queue head pointer 502. The segment management information 500 is provided for each segment 400. One track table 501 and one empty segment queue pointer 502 are provided within the directory 28.

FIG. 9 shows the following information provided as the segment management information 500 according to this embodiment.

An empty segment pointer 800 . . . a pointer to the segment management information 500 for another empty segment 400.

A partial write flag 801 . . . a flag indicating that the write after data 29 written upon the partial write request are being stored in the segment 400 corresponding to the segment management information 500 of concern.

A cached track number 805 . . . the number of the track 300 stored in the segment 400 corresponding to the segment management information 500 of concern.

A record pointer 806 . . . a pointer to the record 301 stored in the segment 400 corresponding to the segment management information 500 of concern. For example, the n-th record pointer 806 is a pointer to the record 301 having the record number 602 (n-1). If the record 301 having the record number 602 (m-1) is not being stored in the cache memory 26, the m-th record pointer 806 takes a null value. In this example, it is assumed that the top record pointer 806 is a pointer to the record 301 having the record number 0. The number of record pointers 806 is as many as the number of record numbers 602 which can be defined within one track 300.

An update record pointer 807 . . . a pointer to the write-after record 160 stored in the segment 400 corresponding to the segment management information 500 of concern. In this case, even if the partial write process is for the record 301 already stored in the cache memory 26, the director 25 manages this record 301 as the write-after record 160. Similar to the record pointer 806, the n-th update record pointer 807 is a pointer to the record 301 having the record number 602 (n-1). If the record 301 having the record number 602 (m-1) is not a write-after record 160, the m-th update record pointer 807 takes a null value. The number of update record pointers 807 is also as many as the number of record numbers 602 which can be defined within one track 300.

Update field information 808 . . . information indicating the updated field 606 in the write-after record 160 having the record number n. Namely, the information indicates which combination of the record field 600, key field 607, and data field 601 constitutes the updated field. The number of update field information 808 is also as many as the number of record numbers 602 which can be defined within one track 300.

An intra-segment empty area address 809 . . . an address indicating the start address of an empty area not storing the record 301 within the segment 400 corresponding to the segment management information 500 of concern.

A segment pointer 810 . . . a pointer to the segment within the cache memory 26 corresponding to the segment management information 500 of concern.

FIG. 10 shows the structure of the track table 501. The track table 501 stores information regarding whether or not each track of all disk units 24 is assigned the segment 400. If the segment is assigned to the track, the information of the track table 501 is a pointer to the segment management information 500 corresponding to the assigned segment. If not, the information takes a null value. In the track table 501, the information of the tracks 300 of the same disk unit 24 is stored in sequential order by track number.

As shown in FIG. 11, the segment management information 500 for the empty segments 400 is first identified by the empty segment queue head pointer 502 and then sequentially interconnected by the empty segment pointers 800 for the corresponding segment management information 500.

Figure 12:
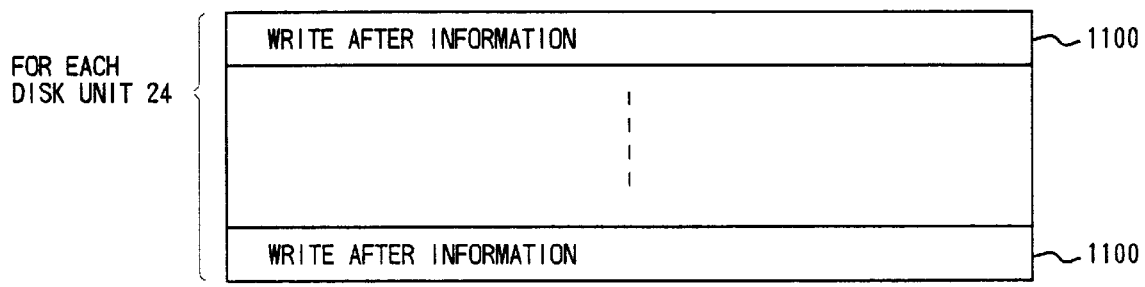
FIG. 12 shows an example of the structure of the write-after memory 27 according to the first embodiment of this invention.

FIG. 12 shows the structure of the write-after memory 27 which stores write-after information 1100 for each disk unit 24. The write-after information 1100 includes information representative of an execution state of the write-after process, and error information.

Figure 13:
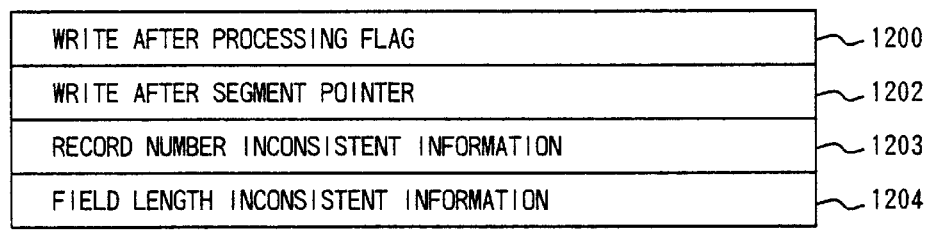
FIG. 13 shows an example of the structure of the write-after information 1100 according to the first embodiment of this invention.

FIG. 13 shows the contents of write-after information 1100. The contents of write-after information 1100 will be described below.

A write-after processing flag 1200 . . . a flag indicating if the disk unit 24 corresponding to the write-after information 1100 of concern is executing the write-after process.

A write-after segment pointer 1202 . . . a pointer to the segment management information 500 corresponding to the track 300 subjected to the write-after process. "Record number inconsistent" information 1203 . . . information representative of the record number 602 of the record 301 subjected to the write-after process, the record 301 being not stored in the disk unit 24. "Field length inconsistent" information 1204 . . . information representative of the field 606 subjected to the write-after process, the length of the field 606 being inconsistent.

If the "record number inconsistent" information 1203 of "field length inconsistent" information 1204 is present, an error has occurred during the write-after process. An error may occur because of other reasons. However, since such an error is not directly associated with the present invention, the description therefor is omitted.

The above information may be erased by power failure or the like so that the information is preferably stored in a non-volatile manner.

Figure 14:
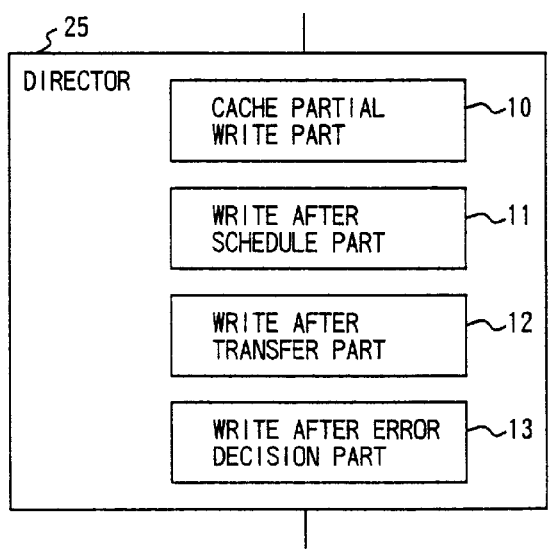
FIG. 14 shows an example of the structure of the director 25 of the first embodiment of this invention.

FIG. 14 shows the structure of the director 25 according to this embodiment. Each part will be described below.

A cache partial write part 10 . . . upon reception of a partial write request, it transfers data received from the channel 22 to the cache memory 26.

A write-after schedule part 11 . . . it determines the disk unit 24 and track 300 to be subjected to the write-after process.

A write-after transfer part 12 . . . it executes the write-after process scheduled by the write-after schedule part 11.

A write-after error decision part 13 . . . upon reception of an input/output request from CPU 20, it checks if there occurs an error a the disk unit 24 to which the request was directed, in the write-after process. If an error occurs, such a situation is sent via the channel 22 to CPU 20.

The operation of each part will be described below.

Figure 15:
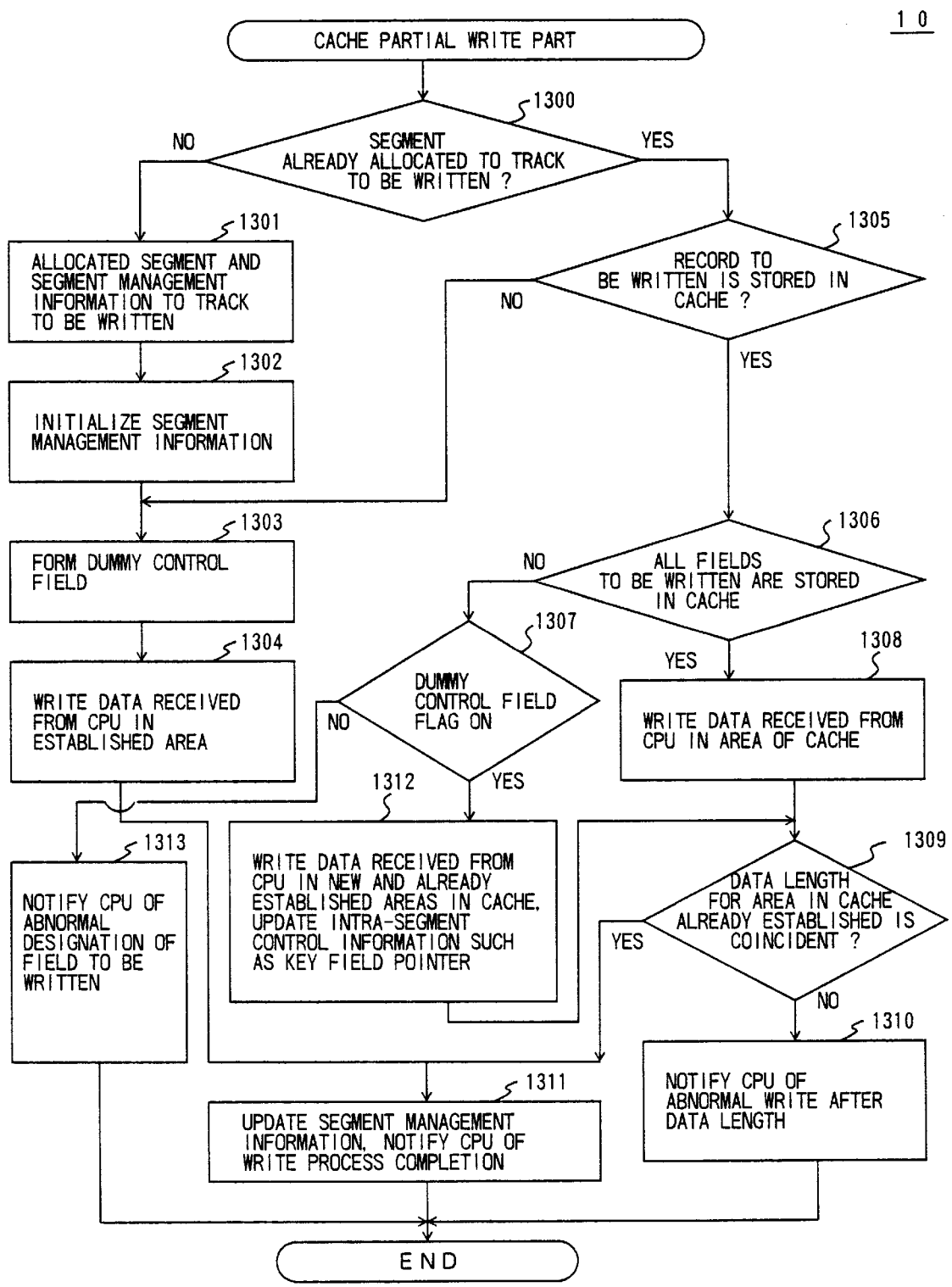
FIG. 15 is a flow chart illustrating the processes o be executed by the cache partial write part 10 according to the first embodiment of this invention.

FIG. 15 is a flow chart illustrating the processes to be executed by the cache partial write part 10. This process flow includes also a process for the case in which the record 301 to be written is already stored in the cache memory 26. This process flow is executed when the director 25 receives a partial write request from CPU 20 via the channel 22, the partial write request including the designated information 5 for designating a process mode by which even if the record 301 to be written is not being stored in the cache memory 26, the write process is completed when the data have been stored in the cache memory 26.

At step 1300, it is checked if the segment 400 has already been allocated to the track 300 to be written. This check relies on the track table 501 corresponding to the track 300 of concern. If the segment 400 is not still allocated, the process flow advances to step 1301. If already allocated, the process flow jumps to step 1305.

At step 1301, the segment 400 and segment management information 500 are allocated to the track 300 of concern. The allocation method may be a known method.

At step 1302, the allocated segment information 500 is initialized. This initialization includes, for example, a process of setting the track number of the track 300 to be written as the cached track number 805.

At step 1303, by using the record number designated by the designated information 3, the dummy control field 1000 is formed.

At step 1304, the data received from the channel 22 are stored in the area corresponding to the field 606 designated by the designated information 4. Thereafter, the process flow advances to step 1311.

At step 1311, the necessary portion of the segment management information 500 is updated, and a completion of the write process is notified to CPU 20 via the channel 22 to thereafter terminate the write process.

On the other hand, if affirmative at step 1300, it is checked at step 1305 if the record 301 to be written is actually stored in the cache memory 26. This is carried out by referring to the segment management information 400 and checking whether or not the record pointer 806 to the record number 602 of concern takes a null value. If the record 301 to be written is not actually stored in the cache memory 26, the process flow jumps to step 1303 and thereafter, executes as for the case where the segment 400 has not been allocated to the track 300 to be written. If the record 301 to be written is actually stored in the cache memory 26, the process flow advances to step 1306.

At step 1306, it is checked if all the field 606 designated by the designated information 4 from CPU 20 are stored in the cache memory 26. If they are stored, the process flow advances to step 1308. If not, the process flow advances to step 1307.

At step 1307, it is checked if the dummy control field flag 1003 for the record 301 to be written is on or off. If off, it means that the record 301 to be written was loaded in the cache memory 26 from the track 300. Therefore, this case contradicts the check results at step 1306 that all the field 606 have been stored. The process flow therefore jumps to step 1313 to issue an error notice. If the dummy control field flag 1003 is on, then the process flow advances to step 1312.

At step 1312, the data received from the channel 22 are stored in the areas corresponding to the field 606 already stored and newly established. The length of the data newly stored in the cache memory 26 is stored as the key field length 608 or data field length 603 within the dummy control field 1000. A proper value is set to the key field pointer 1001 or data field pointer 1002. Thereafter, the process flow advances to step 1309.

On the other hand if affirmative at step 1306, the data received from the channel 22 are stored in the cache memory 26 at the area corresponding to the field 606.

At step 1309 it is checked if the stored data in the cache memory 26 at the area corresponding to the field 606 are consistent with the key field length 608 or data field length 603 within the control field 600. If consistent, the process flow advances to step 1311. If not, the process flow 1310 advances to step 1310.

At step 1310, the data length inconsistency is announced to CPU 20 via the channel 22 to thereafter terminate the process.

On the other hand if negative at step 1307, the director 25 notifies the CPU 20 via the channel 22 at step 1313 of the fact that there is contradiction with respect to the field 606 to be written to thereafter terminate the process.

Figure 16:
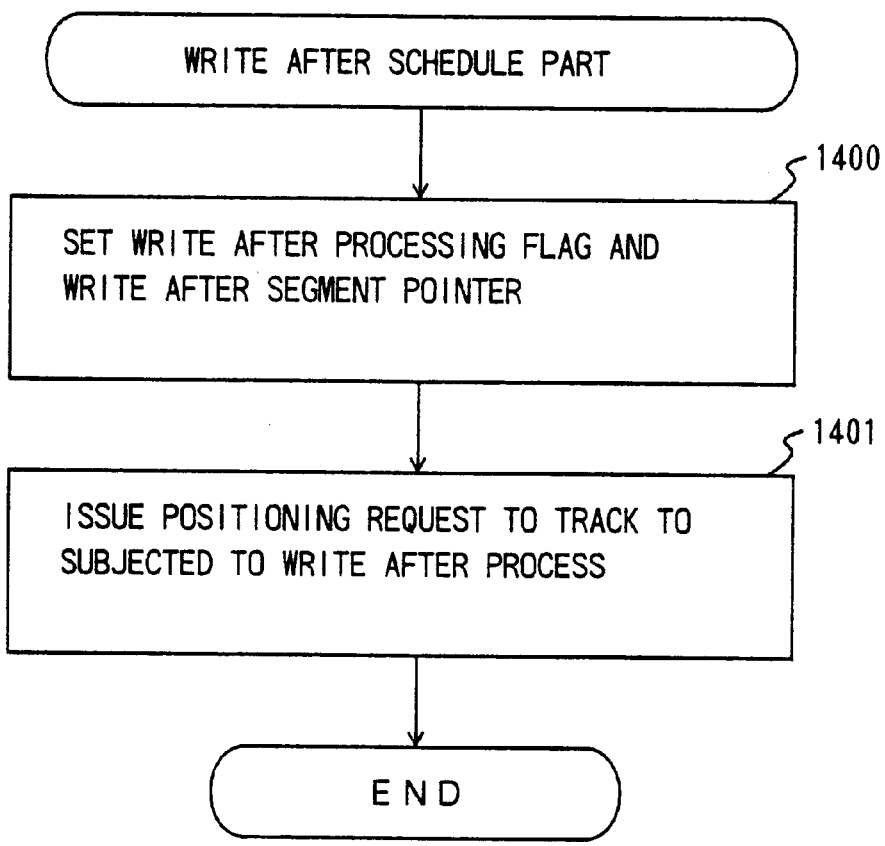
FIG. 16 is a flow chart illustrating the processes to be executed by the write-after schedule part 11.

FIG. 16 is a flow chart illustrating the processes to be executed by the write-after schedule part 11. This process flow includes also a process of writing in the disk unit 24 the write-after data 29 contained in the record 301 stored in the cache memory 26.

This process flow is executed by the director 25 during the idle time. Namely, upon reception of a partial write request, the data stored in the cache memory are written in the disk unit 24.

The disk unit 24 to be written is the disk unit of which the write-after processing flag 1200 is off and to which an input/output request is not acknowledged. The track 300 to be written in the write-after process is a track corresponding to the segment management information 500 whose partial write flag 801 is on.

First at step 1400, the write-after processing flag 1200 of the write-after information 1100 of the disk unit 24 to be operated is turned on, and a pointer to the segment management information 400 for the track 300 to be written is set as the write-after segment pointer 1202.

At step 1401, a positioning request for the track 300 to be written is supplied to the disk unit 24 to be operated, to thereafter terminate the process flow.

Figure 17:
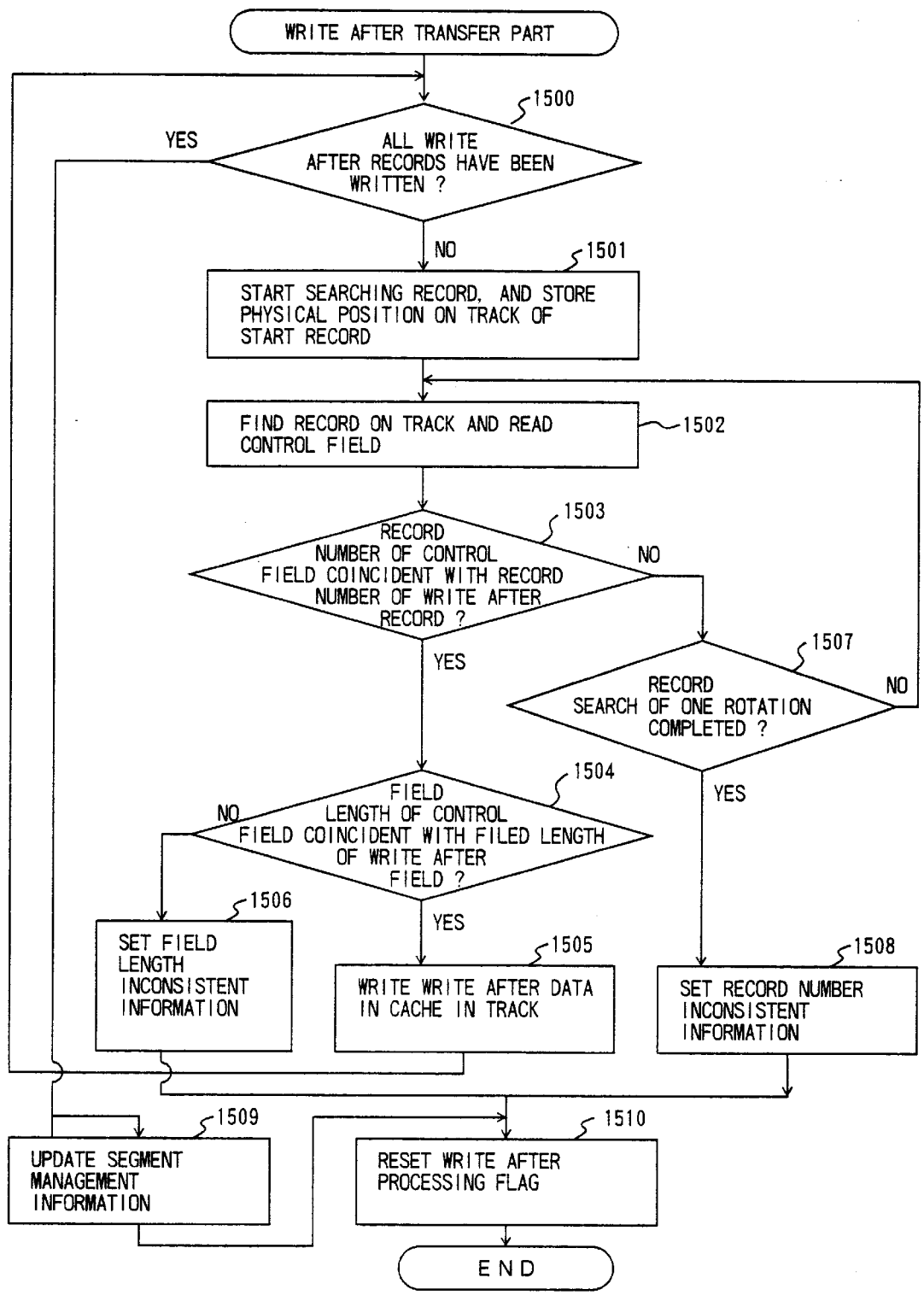
FIG. 17 is a flow chart illustrating the processes to be executed by the write-after transfer part 12 according to the first embodiment of this invention.

FIG. 17 is a flow chart illustrating the processes to be executed by the write-after transfer part 12. This process flow includes also a process of writing in the disk unit 24 the write-after data contained in the record 301 stored in the cache memory 26.

This process flow is executed after the positioning request for the disk unit generated by the write-after schedule part 11 has been completely carried out.

At step 1500 it is checked if all the write after records 160 have been completely written in the object track 300. If there is no null value in all the update record pointers 807 in the segment management information 500 pointed by the write-after segment pointer 1202, it means that the write-after record 160 has been completely written. If there is a null value, it means that all the write-after record 160 is not written. If completed, the process flow jumps to step 1509. If not, the process flow advances to step 1501.

At step 1501, the record 301 of the track 300 is searched while storing the physical position of the track 300 from which the search started. The stored physical position is used to check one revolution of the track 300.

At step 1502, the control field 600 of the record 301 on the track 300 is read.

At step 1503, the record number 602 within the read-out control field 600 is compared with the record number 602 within the dummy control field 1000 or control field 600 pointed by the update record pointer 807. If both the record numbers 602 are coincident, it means that the record 301 now accessed is to be used for the write-after process so that the process flow advances to step 1504. If not, the process flow advances to step 1507.

At step 1504, the field 606 to be written is detected by using the update field information 808 corresponding to the update record pointer 807. The length of the detected field 606 is derived from the key field length 608 or data field length 603 within the dummy control field 1000 or control field 600. The derived length is compared with the key field length 608 or data field length 603 within the control field 600 read from the track 300 at step 1502, to check if they are coincident. If not coincident, the process flow advances to step 1506 without writing the data. If coincident, the process flow advances to step 1505. At step 1505, the write-after data 29 for the field 606 to be written is read from and written in the accessed record 301 on the track 300 to thereafter return to step 1500.

At step 1506, there is set the "field length inconsistent" information 1204 of the write-after information 1100 to thereafter advance to step 1510.

At step 1507 it is checked if the record 301 to be written has undergone one revolution in the search for the track 300. If not, the process flow returns to step 1502 to continue the search. If one revolution has been completed, the process flow advances to step 1508.

At step 1508, there is set the "record number inconsistent" information 1203 to thereafter advance to step 1510.

At step 1509, the segment management information 400 is updated, which has become necessary upon completion of the write-after process.

At step 1510 the write-after processing flag 1200 is reset to thereafter terminate the process flow.

Figure 18:
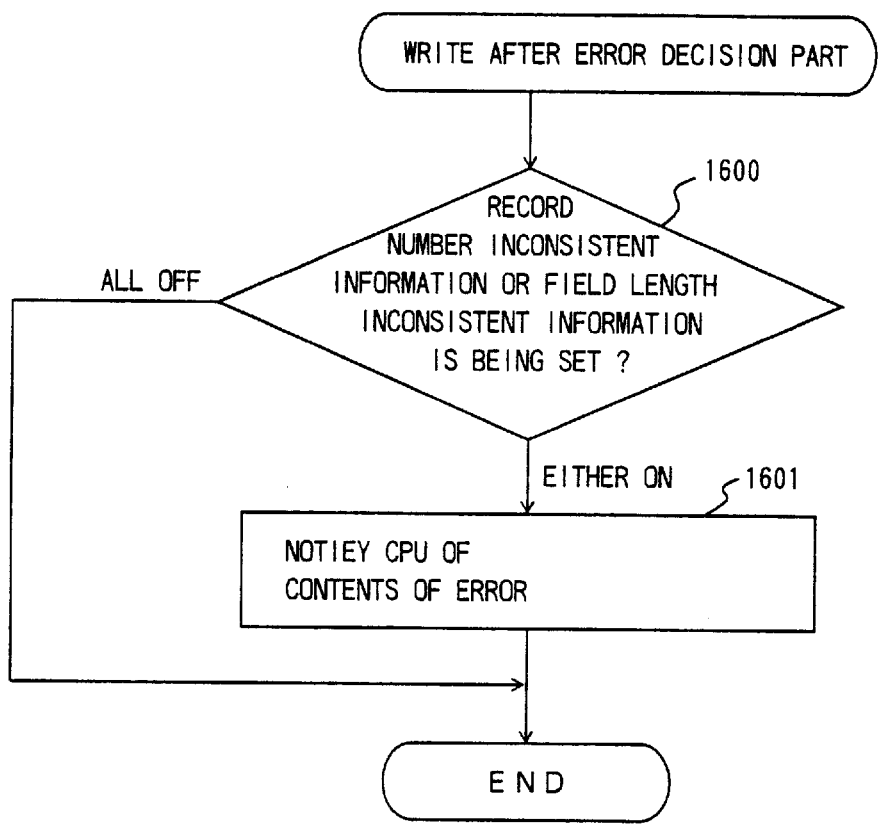
FIG. 18 is a flow chart illustrating the processes to be executed by the write-after error decision part 13.

FIG. 18 is a flow chart illustrating the processes to be executed by the write-after error decision part 13.

This process flow is executed when an input/output request is received from CPU 20 via the channel 22.

It is checked at step 1600 whether or not there is being set the "record number inconsistent" information 1203 or "field length inconsistent" information 1204 of the write-after information 1100 for the object disk unit 24. If neither the inconsistent information 1203 nor 1204 is being set, the process flow terminates. If at least one of the inconsistent information 1203 or 1204 is being set, then the process flow advances to step 1601.

At step 1601, an error notice is given to CPU 20 to thereafter terminate the process flow.

Next, the second embodiment will be described with reference to FIGS. 19 to 25. According to this embodiment, in the case where the record 301 to be written is not being stored in the cache memory 26, the director 25 executes a check operation based on the information held in the control unit 23 and the write process is completed when the data have been written in the cache memory 26.

Figure 19:
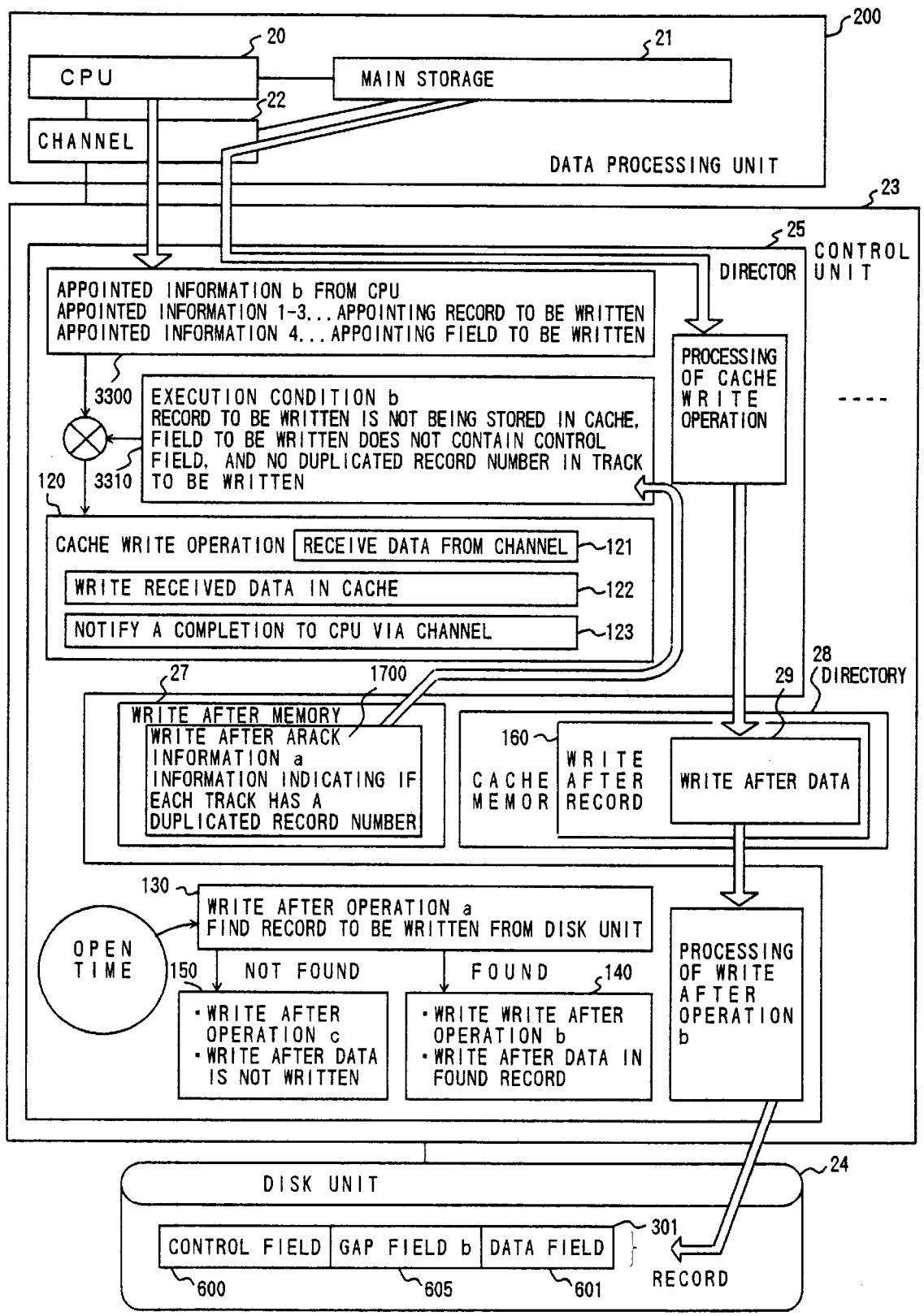
FIG. 19 is a block diagram showing the fundamental structure of a control unit according to a second embodiment of this invention.

FIG. 19 is a detailed block diagram showing the information processing system of this embodiment. The different points of this embodiment from the first embodiment shown in FIG. 1 are as follows. First, the write-after memory 27 stores write-after track information a 1700 indicating whether or not each track 300 contains a duplicated record number. Second, the designated information b 3300 from CPU 20 does not contain the designated information 5 which designates a process mode for the case where the record to be written 301 is not being stored in the cache memory 26. Third, the execution condition b 3310 of the cache write operation 120 contains a condition that the track 300 to be written does not contain a duplicated record number. The other structure is the same as the first embodiment shown in FIG. 1. The following description is given while paying attention mainly to the different points from the first embodiment.

Figure 20:
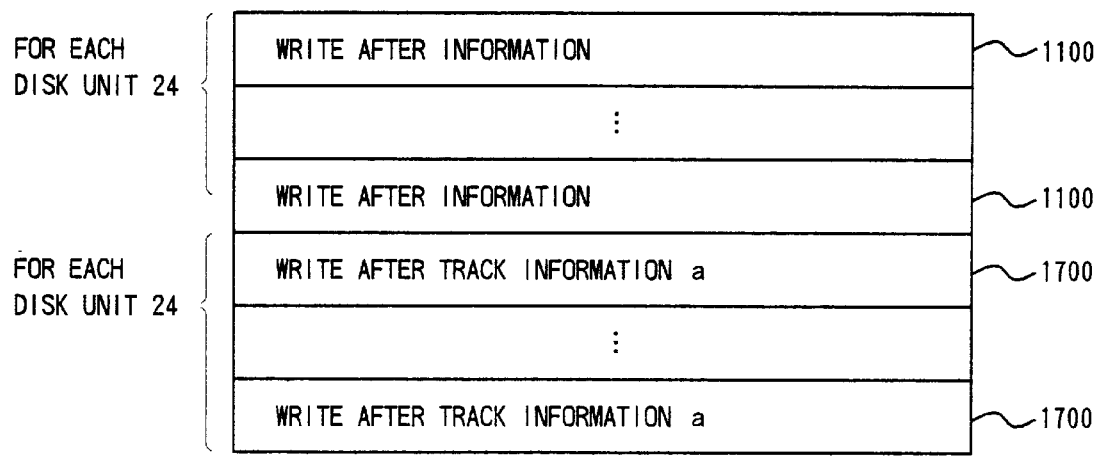
FIG. 20 shows an example of the structure of the write-after memory 27 according to the second embodiment of this invention.

FIG. 20 shows the structure of the write-after memory 27 of this embodiment. The difference from the write-after memory 27 of the first embodiment shown in FIG. 12 resides in that the write-after memory 27 of this embodiment stores the write-after track information a 1700 provided for each disk unit 24.

Figure 21:
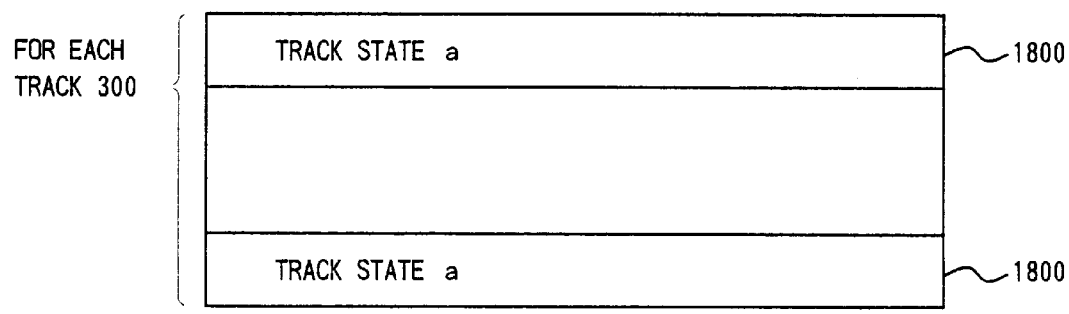
FIG. 21 shows an example of the structure of the write after track information a 1700 according to the second embodiment of this invention.

FIG. 21 shows the structure of the write-after track information a 1700. The write-after track information a 1700 includes track state information a 1800 representative of one of three states, a state that there is no duplicated record number, a state that there is a duplicated record number, and a state that it is not certain if there is a duplicated record number. The track state a 1800 of each track 300 is stored in the order of track number.

Figure 22:
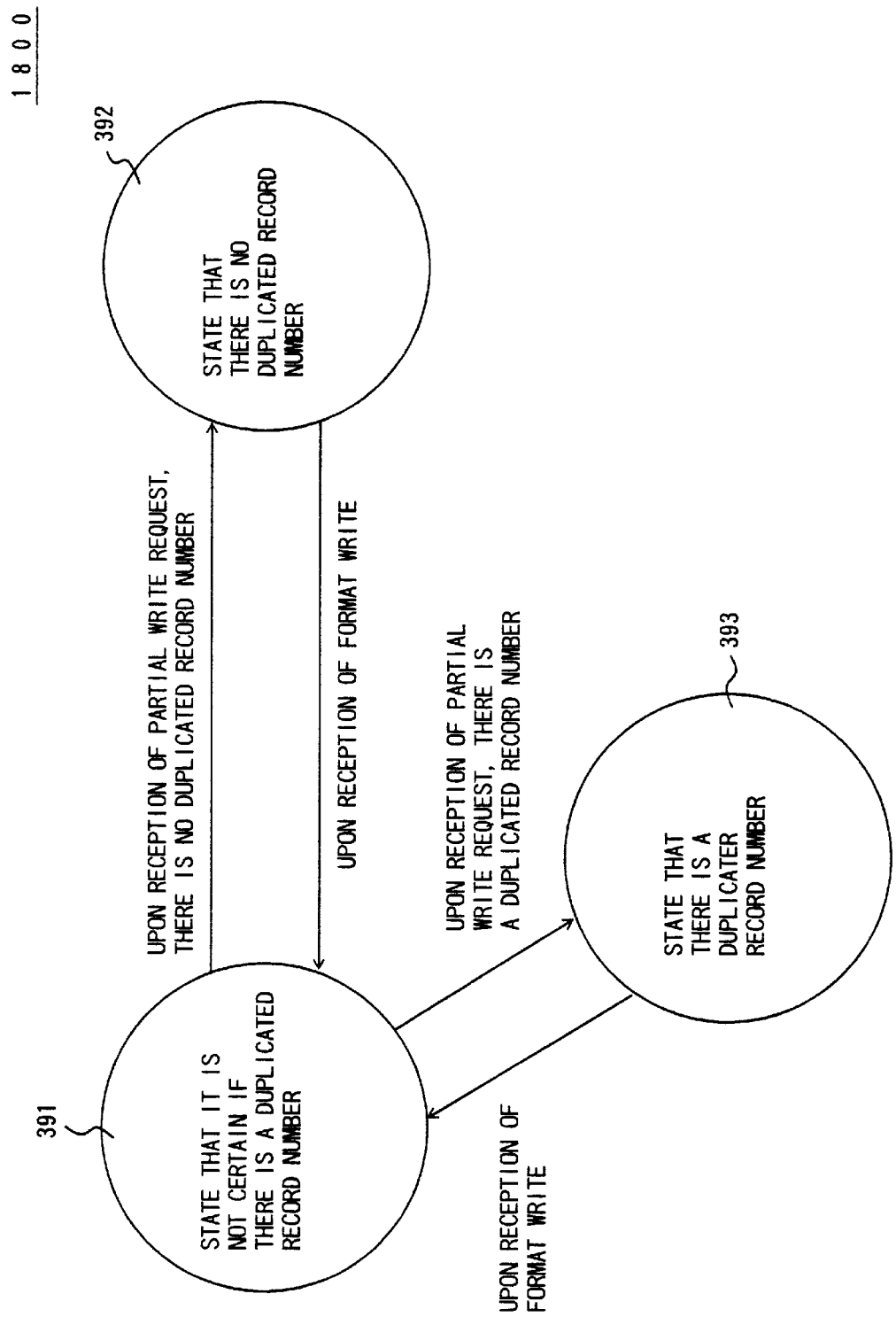
FIG. 22 is a state transition diagram of the track state a 1800 according to the second embodiment of this invention.

FIG. 22 shows a state transition of the track state a 1800. The track state a 1800 initially takes a state 391 that it is not certain if the track 300 has a duplicated record number. Upon reception of a partial write request in this state 391, the director 25 checks if the track 300 has a duplicated record number or not. If there is no duplicated record number, the track state a 1800 is set to a state 392 that there is no duplicated record number. If there is a duplicated record number, the track state a 1800 is set to a state 393 that there is a duplicated record number. If a format write request is received, the director 25 causes the track state a 1800 to take the state 391 that it is not certain if there is a duplicated record number or not. The reason for this is that there is a possibility that the record number 602 of the record may be changed by the format write process.

The cache memory 26, storage format of the segment 400, directory 28, segment management information 500, track table 501, and empty segment queue head pointer 502 all have the same structure as the first embodiment, respectively shown in FIGS. 6, 7, 8, 9, 10, and 11.

Figure 23:
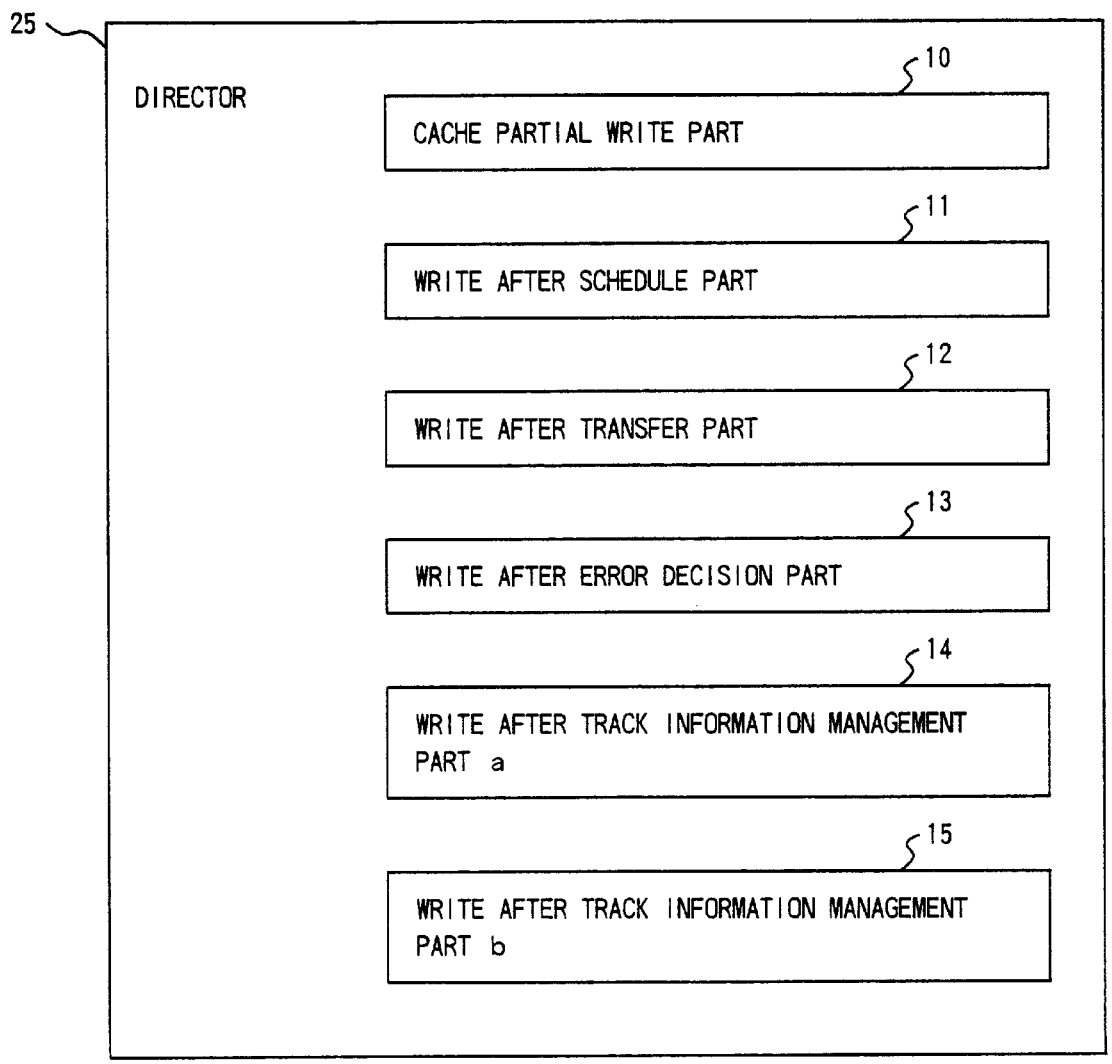
FIG. 23 shows an example of the structure of director 25 according to the second embodiment of this invention.
Figure 24:
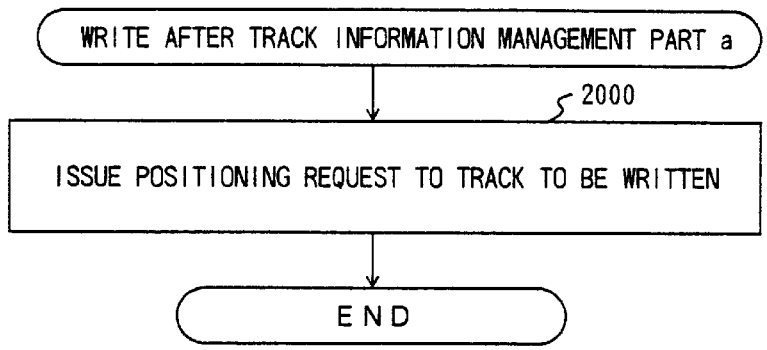
FIGS. 24A and 24B are flow charts illustrating the processes to be executed by the write-after track information management part a 14 according to the second embodiment of this invention.
Figure 24:
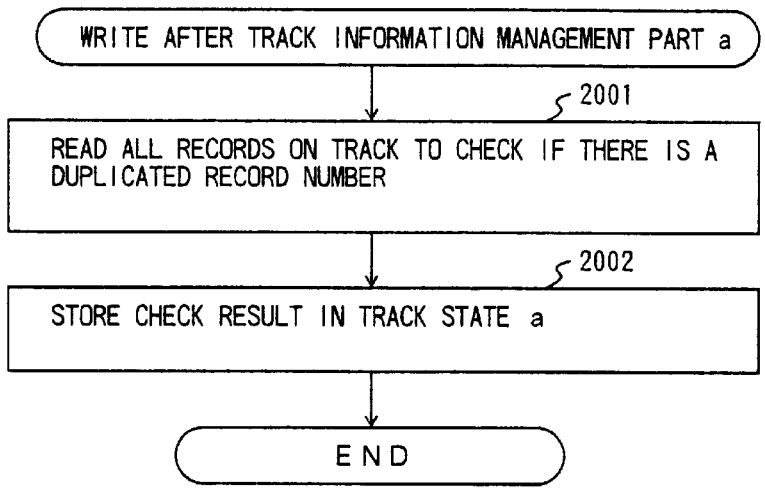

FIG. 23 shows the structure of the director 25 of this embodiment. The different points from the director 25 of the first embodiment shown in FIG. 1 are that the director 25 of this embodiment has the following two parts.

A write after track information management part a 14 . . . this part operates in the following manner. When a partial write request is received for the track 300 whose track state a 1800 takes the state 391 that it is not certain if the track 300 has a duplicated record number or not, this part checks if the track 300 has a duplicated record number or not, and the check result is stored as the track state a 1800.

A write-after track information management part b 15 . . . this part operates in the following manner. When a format write request is received for the track 300, this part causes the track state a 1800 of the track 300 to take the state 391 that it is not certain if there is a duplicated record number or not.

The process flows for the cache partial write part 10, write-after schedule part 11, write-after transfer part 12, and write-after error decision part 13 are the same as those shown in FIGS. 15 to 18, except that the flow process of the cache partial write part 10 becomes executable in a manner different from the first embodiment. Namely, in this embodiment, the flow process of the cache partial write part 10 is allowed to be executed only when the track state a 1800 of the track 300 to be subjected to the partial write request from CPU 20 takes the state 392 that there is no duplicated record number.

FIGS. 24A and 24B are flow charts to be executed by the write-after track information management part a 14.

The process flow shown in FIG. 24A is allowed to be executed when the director 25 receives a partial write request for the track 300 whose track state a 1800 takes the state 391 that it is not certain if there is a duplicated record number.

At step 2000, a positioning request is issued to the track 300 to which the partial write request was directed, to thereafter terminate the process flow.

The process flow shown in FIG. 24B is allowed to be executed when the positioning request issued at step 2000 has been completed.

At step 2001, it is checked if there is a duplicated record number, by reading all records 301 in the track 300 to which the partial write request was directed.

At step 2002, the check result is stored in the track state a 1800 of the track 300 of concern, to thereafter terminate the process flow.

Figure 25:
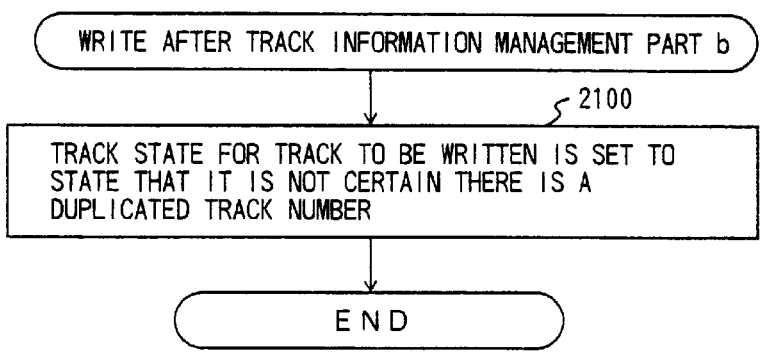
FIG. 25 is a flow chart illustrating the processes to be executed by the write-after information management part b 15 according to the second embodiment of this invention.

FIG. 25 is a flow chart to be executed by the write-after track information management part b 15.

This process flow is allowed to be executed when the director 25 receives a format write request.

At step 2100, the track state a 1800 of the track 300 to be subjected to the format write process is caused to take the state 391 that it is not certain if there is a duplicated record number or not, to thereafter terminate the process flow.

The third embodiment will be described next with reference to FIGS. 26 to 34. According to the third embodiment, if the record 301 to be written is not being stored in the cache memory 26 and only when specific designated information is received from CPU 20, the data are written in the cache memory 26 and the write process is completed at this stage. Moreover, the efficiency of the write-after process is intended to be improved by calculating the physical write position on the track 300 of the record 301 to be written.

In the following there will be described the reason why the write-after process efficiency is improved by calculating the physical write position.

Figure 33:
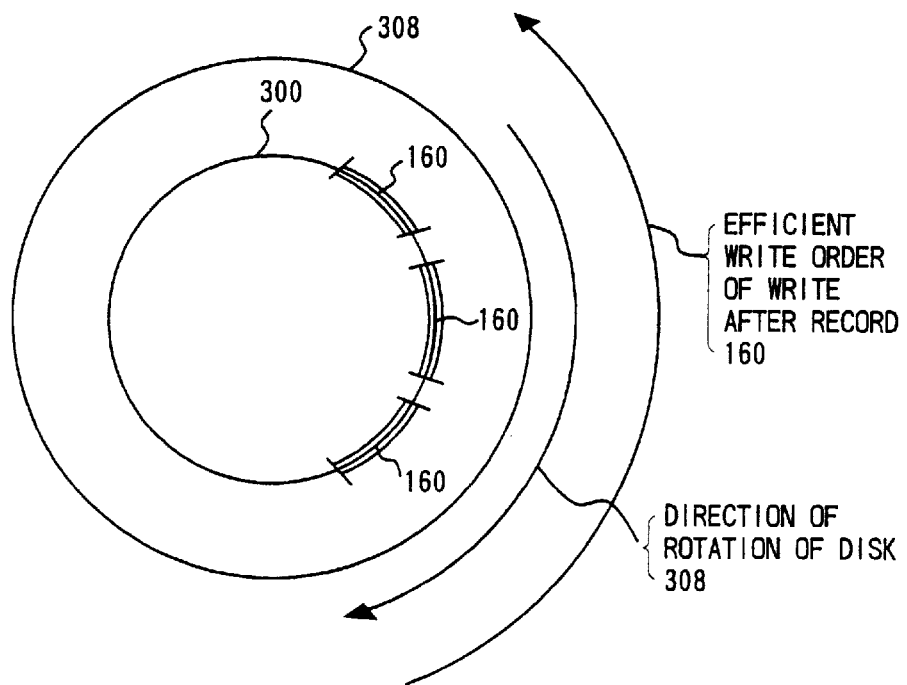
FIGS. 33 and 34 conceptually illustrate the method of efficiently writing the write-after record 160.
Figure 34:
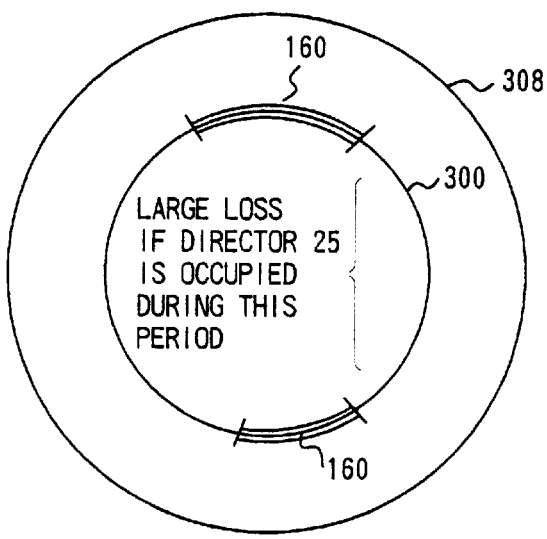

As shown in FIG. 33, the write efficiency can be improved if a plurality of write-after records 160 are written in records 301 below the read/write head 309 at physical write positions disposed sequentially in the direction opposite to the direction of rotation of the disk 308. Furthermore, as shown in FIG. 34, in the case where two physical write positions are spaced apart by a predetermined distance or more, the efficiency can be further improved if the write-after process is intercepted between the two write-after records 160 because waste time to be occupied by the director 25 and data transmission lines is eliminated.

Figure 26:
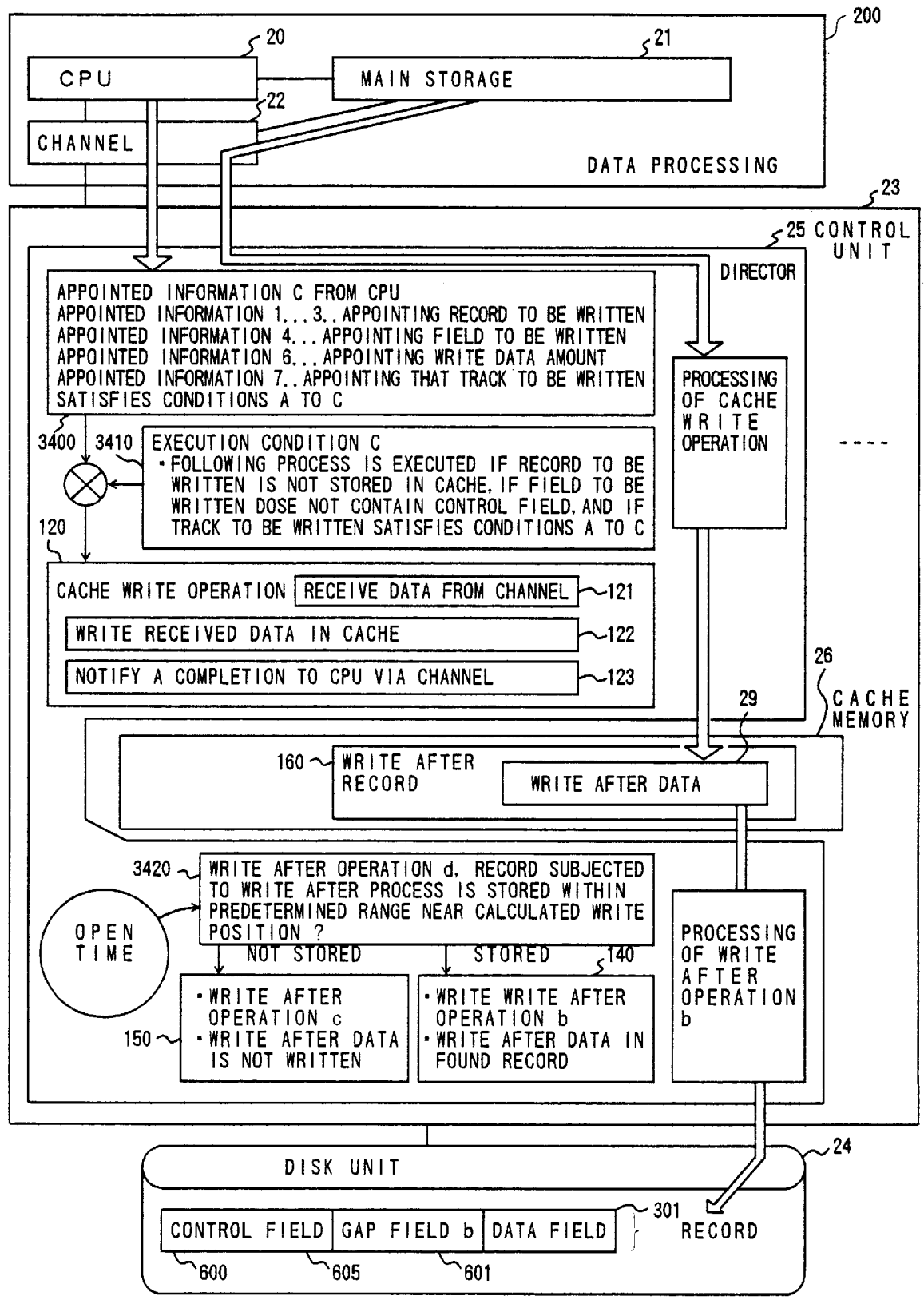
FIG. 26 is a block diagram showing the fundamental structure of the control unit 23 according to a third embodiment of this invention.

FIG. 26 is a detailed block diagram showing the information processing system of this embodiment. The different points from the first embodiment shown in FIG. 1 are as follows.

First, the designated information 3400 from CPU 20 has not the designated information 5, but has designated information 6 and 7.

The designated information 6 designates the write data amount. If there is only one field to be written, the length of this field 606 is used as the write data amount. When the director 25 receives the designated information 6 from CPU 20, the physical write position on the track of the record 301 to be written can be calculated before the director 25 receives the data from the channel 22. The designated information 6 need not always be provided, so the designated information 6 is shown between parentheses in FIG. 26.

The designated information 7 is the information indicating that the track 300 to be written satisfies the following structural conditions A to C.

Condition A . . . The record numbers 602 of the records 301 on the track 300 to be written are given in the ascending order starting from the record number "0" of the control record 310, each incremented by "1".

Condition B . . . The field 606 other than the control field 600 contains only the data field 601, and the length of the data field 601 of the record 301 other than the control record 310 is the same for each record within the same track.

Condition C . . . The control record 310 is a standard record. Namely, the field 606 other than the control field 600 of the control record 310 contains only the data field, and the length of the data field has a predetermined standard length.

If the structural conditions A to C are satisfied, it becomes possible to calculate the physical write position on the track 300 of the record 301.

The reason why the physical write position can be calculated is as follows.

If the condition A is satisfied, it is possible to know where the record 301 to be written from the start of the track 300 is, based upon the record number 602 from the channel 22 received by the director 25. If the conditions B and C are then satisfied, it is possible to know the length of the field 606 of each record 301 on the track 300, based upon the length of the data received from the channel 22 or the write data amount contained in the designated information 6. With the above-described information, it is possible to calculate the physical position on the track 300 of the record 301 to be written.

Whether or not the track 300 to be written satisfies the conditions A to C is provided to the control mechanism within CPU 20. Thus, CPU 20 can generate the designated information 7.

Another different point from the first embodiment is that the execution condition c 3410 of the cache write operation 120 is satisfied if the track 300 to be written satisfies the conditions A to C.

The following is still another different point from the first embodiment with respect to the operation of writing the write-after data 29 into the disk unit 24.

Specifically, for the write-after operation d 3420, the director 25 checks if the record 301 having the record number 602 supplied from the designated information 3 is present near or within a predetermined distance from the calculated write position of the record 301 on the track 300 of the disk unit 24. Scanning the record near the predetermined distance from the calculated write position is executed because the physical position of the record 301 will be displaced to some degree if a faulty record unable to be read/written is present on the track 300.

The cache memory 26, directory 28, track table 501, empty segment queue head pointer 502, and write-after memory 27 all have the same structure as the first embodiment, respectively shown in FIGS. 6, 8, 10, 11, and 12.

The dummy control field 1000, the key field pointer 1001, data field pointer 1002, and dummy control field flag 1003 of the segment 400 have all the same structure as the first embodiment shown in FIG. 7.

However, the key field 607 is not present in the record 301 of the track 300 satisfying the conditions A to C, so that the key field length 608 of the dummy control field 1000 is always "0", and the key field pointer 1001 always takes a null value. Moreover, the field 606 to be subject to the partial write process contains only the data field 601, so that the dummy control field 1000, key field pointer 1001, data field pointer 1002, dummy control field flag 1003, and data field 601 are all stored in consecutive areas.

FIG. 27 shows the structure of the segment management information 500 of this embodiment. The difference from the first embodiment shown in FIG. 9 resides in that the segment management information 500 of this embodiment includes the following information.

A write position calculation possible bit 2200 . . . This bit indicates whether or not the track 300 of the segment management information of concern satisfies the conditions A to C.

A fixed data field length 2201 . . . This length is representative of the fixed length of the data field 601 of the record 301 other than the control record 310.

FIG. 28 shows the structure of the write-after information 1100. The difference from the first embodiment shown in FIG. 13 resides in that the write-after information 1100 of this embodiment includes the following information.

A write-after start record number 2300 . . . In this embodiment, if the positions of two write-after records 160 on the track 300 are spaced by a predetermined distance or more, the data transfer to the disk unit 24 is intercepted and the positioning process is executed to improve the efficiency of the write-after process. Therefore, the record number 602 of the write-after record 160 is set as this write-after start record number. "Record physical position inconsistent" information 2301 . . . This information is set if the record 301 is not present at the calculated physical position.

The structure of the director 25 is similar to the first embodiment shown in FIG. 14, and is constructed of the cache partial write part 10, write-after schedule part, 11, write-after transfer part 12, and write-after error decision part 13. The process flow for each part is different from the first embodiment, which will be described below.

Figure 29:
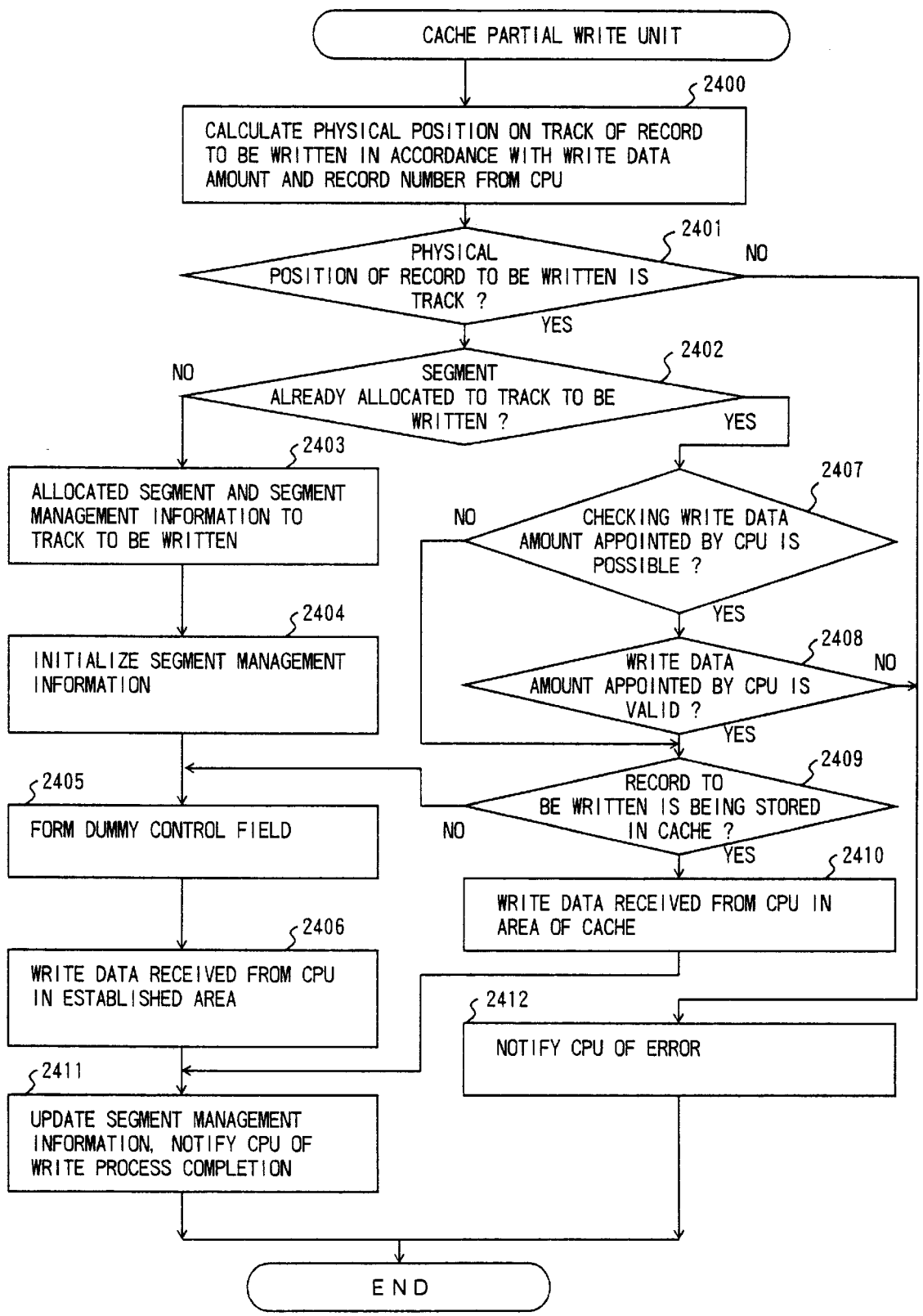
FIG. 29 is a flow chart illustrating the processes to be executed by the cache partial write part 10 according to the third embodiment of this invention.

FIG. 29 is a flow chart illustrating the processes to be executed by the cache partial write part 10. Similar to the process flow of the first embodiment, this process flow includes also a process for the case where the record 301 to be written is already stored in the cache memory 26.

This process flow is executed when a partial write request is received together with the information that the track 300 to be written satisfies the conditions A to C.

This process flow will now be described below while paying attention mainly to the different points from the first embodiment shown in FIG. 15.

At step 2400, the physical position of the record 301 on the track 300 is calculated in accordance with the record number received from the designated information 3 and the write data amount received from the designated information 6.

At step 2401, it is checked if the range determined by the calculated physical position is within the capacity of one track 300. If not, the process flow advances to step 2412, and if the range is within the capacity, it advances to step 2402.

At step 2402, it is checked if the segment 400 has been allocated to the track 300 to be written. If already allocated, the process flow advances to step 2407, and if not, it advances to step 2403.

At steps 2403 and 2404, the track 300 to be written is allocated with the segment 400 and segment management information 500, and the segment management information is initialized. These processes are similar to those at steps 1301 and 1302 shown in FIG. 15.

The processes at the steps 2405 and 2406 are executed when a partial write request is received for the record 301 not present in the cache memory 26. These processes are similar to those at steps 1303 and 1304 shown in FIG. 15. After the process at step 2406, the process flow advances to step 2411.

At step 2407, it is checked if the validity of the write data amount received from the designated information 6 can be checked or not. Namely, it is checked if the director 25 can check the write data amount designated by CPU 20.

If the record to be written is the control record 310, the data field length 602 of the control record 310 on the track 300 has a specific reference value because of the condition C. It is therefore possible to check the validity of the write data amount by comparing the write data amount designated by CPU 20 with the reference value of the data field 601 of the control record 310.

If the record 301 to be written is a record other than the control record 310, the data field length 602 of each record 301 other than the control record 310 is the same because of the condition B. Therefore, if at least one record 301 other than the control record is stored in the cache memory 26, then it is possible to check the validity by comparing the write data amount designated by CPU 20 with the data field length of the record 301 other than the control record stored in the cache memory 26.

If the validity check is not possible, the process flow jumps to step 2409, and if possible, it advances to step 2408.

At step 2408, the validity of the write data amount is checked. If the write data amount is not valid, the process flow jumps to step 2412 in order to notify an error to CPU 20. If the write data amount is valid, the process flow advances to step 2409.

At step 2409, it is checked if the record 301 to be written is being stored in the cache memory 26. This step is similar to step 1305 shown in FIG. 15. If the record 301 is not being stored, the process flow advances to step 2405, and if stored, it advances to step 2410.

At step 2410, the data received from the channel 22 is written in the data field 601 of the cache memory 26.

At step 2411, necessary information of the segment management information 500 is updated, and a completion of the write process is notified to CPU via the channel 22, to thereafter terminate the process flow.

At step 2412, CPU 20 is notified via the channel 22 of the fact that the write data amount is not valid, to thereafter terminate the process flow.

Figure 30:
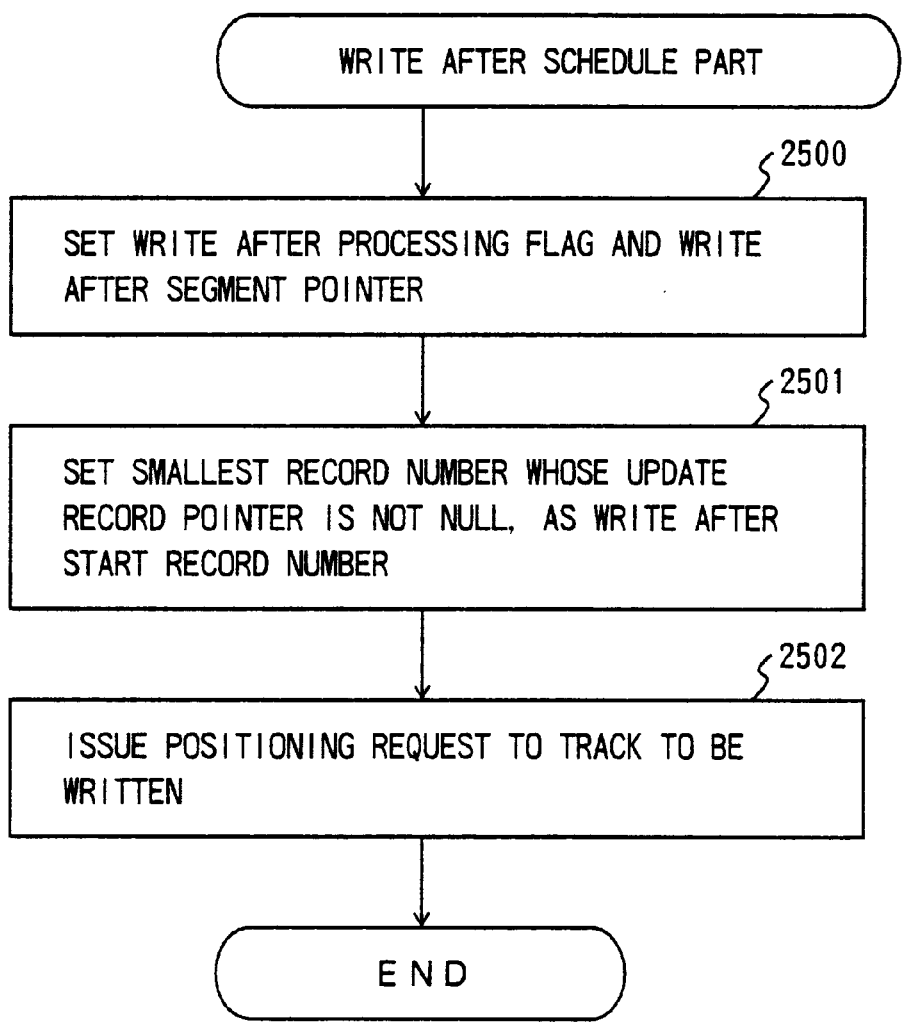
FIG. 30 is a flow chart illustrating the processes to be executed by the write-after schedule part 11 according to the third embodiment of this invention.

FIG. 30 is a flow chart illustrating the processes to be executed y the write-after schedule part 11.

This process flow is executed during the idle time of the director 25.

The process at step 2500 is similar to that at step 1500 of the first embodiment shown in FIG. 16.

At step 2501, the smallest record number 602 whose update record pointer 807 does not take a null value is searched from the segment management information 500 corresponding to the object track 300, and set in the write-after start record number 2300. Since the write-after record 160 is selected in order starting from the smaller record number 602 because of the condition A, the write process can proceed in the direction opposite to the rotation direction of the disk 308 thereby improving the write process efficiency.

At step 2502, a positioning request for the track 300 to be written is issued to the corresponding disk unit 24.

Figure 31:
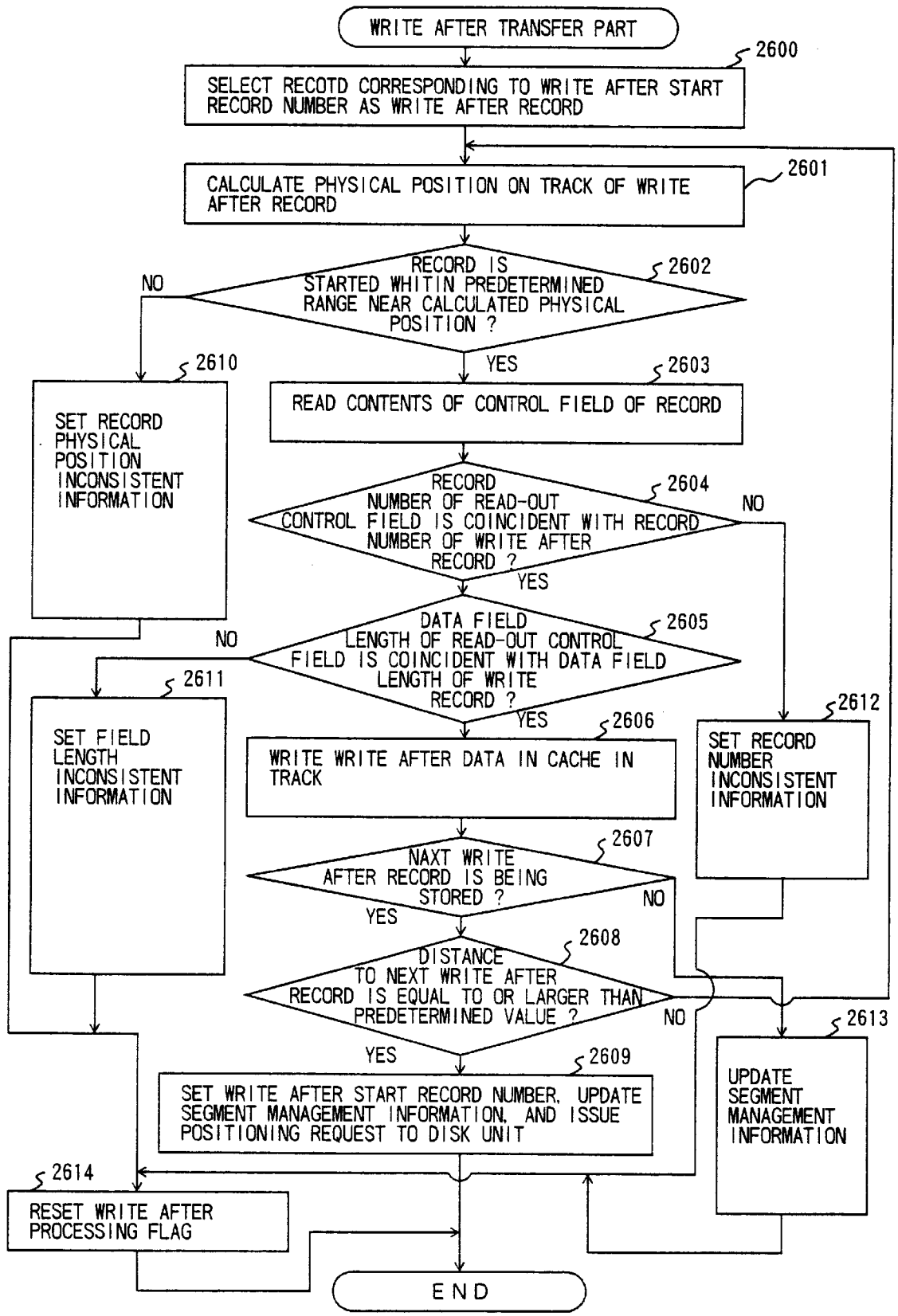
FIG. 31 is a flow chart illustrating the processes to be executed by the write-after transfer part 12 according to the third embodiment of this invention.

FIG. 31 is a flow chart illustrating the processes to be executed by the write-after transfer part 12.

This process flow is executed when the positioning request issued to the disk unit 24 at step 2502 shown in FIG. 30 has been completed.

At step 2600, the write-after record 160 pointed by the update record pointer 807 corresponding to the write-after start record number 2300 is selected as the write-after record to be first written.

At step 2601, the physical write position on the track 300 of the write-after record 160 corresponding to the update record pointer 807 is calculated.

At step 2602, it is checked if the record 301 is being stored within a predetermined range of the calculated physical position. If the record 301 is not being stored, the process flow advances to step 2610, and if stored, it advances to step 2603.

At step 2603, the control field 601 of the stored record 301 is read.

At step 2604, the record number 602 in the read-out control field is compared with the record number 602 in the dummy control field 1000 or control field 600 pointed by the update record pointer 807. If both the record numbers 602 are not coincident, it means an error so that the process flow advances to step 2612. If both the record numbers 602 are coincident, the process flow advances to step 2605/

At step 2605, the data field length 603 in the read-out control field 601 is compared with the data field 603 in the dummy control field 100 or control field 600 pointed by the update record pointer 807. If both the data field length are not coincident, it means an error so that the process flow advances to step 2611. If coincident, the process flow advances to step 2606.

At step 2606, the write-after data 160 are written in the track 300.

At step 2607, the update record pointer 807 having the next large record number 5602 without a null value is searched. If a proper update record pointer 807 cannot be searched, it means that all write-after records 160 for the track 300 of concern have been written, so the process flow advances to step 2613. If a proper update record pointer 807 can be searched, the process flow advances to step 2608.

At step 2608, it is checked if the distance to the record 301 pointed by the searched update record pointer 807 is equal to or larger than a predetermined value. If the distance is smaller than the predetermined value, the process flow returns back to step 2601 to again execute the above-described processes for the record 301 pointed by the searched update record pointer 308. If the distance is equal to or larger than the predetermined value, the process flow advances to step 2609.

At step 2609, the positioning request is issued to the disk unit 24 to thereafter intercept the write-after process. In this case, the record number 602 of the record to be next written is set as the write-after start record number 2300, and necessary information of the segment management information 500 is updated.

At step 2610, the "record physical position inconsistent" information 2301 is set to thereafter advance to step 2614.

At step 2611, the "field length inconsistent" information 1204 is set to thereafter advance to step 2614.

Steps 2612 to 2614 are similar to steps 1508 to 1510 shown in FIG. 17. At these steps 2612 to 2614, the "record number inconsistent" information 1203 is set, the segment management information 500 is updated, and the write-after processing flag 1200 is reset, respectively.

Figure 32:
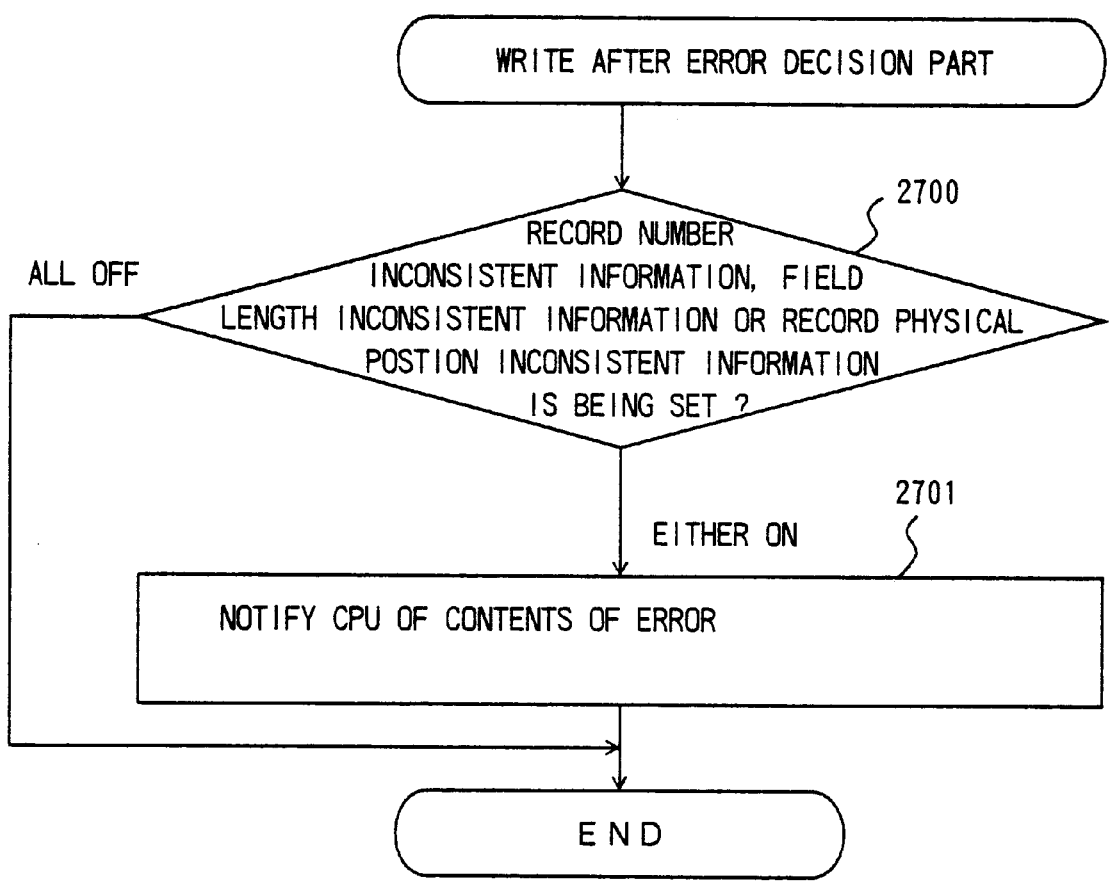
FIG. 32 is a flow chart illustrating the processes to be executed by the write-after error decision part 13 according to the third embodiment of this invention.

FIG. 32 is a flow chart illustrating the processes to be executed by the write-after error decision part 13.

This process flow is executed when an input/output request is received from CPU 20 via the channel 22, similar to the process flow of the first embodiment shown in FIG. 18.

At step 2700, it is checked if data are set in accordance with the "record number inconsistent" information 1203, "field length inconsistent" information 1204 or "record physical position inconsistent" information 2301, respectively in the write-after information 1100 of the disk unit 24 for which the input/output request was issued. If data are not being set for any of the information, the process flow is terminated. If data are being set for any one of the information, the process flow advances to step 2701.

At step 2701, an error is notified to CPU 20.

Next, the fourth embodiment will be described with reference to FIGS. 35 to 41. According to the fourth embodiment, if the record 301 to be written is not being stored in the cache memory 26, the director 25 makes a decision, in accordance with the information held by the control unit 25, that the data are to be written in the cache memory 26 and the write process is completed at this stage. Moreover, the efficiency of the write-after process is intended to be improved by calculating the physical write position on the track 300 of the record 301 to be written.

The information held by the control unit 23 is the information representative of whether each track 300 satisfies the conditions A to C.

Figure 35:
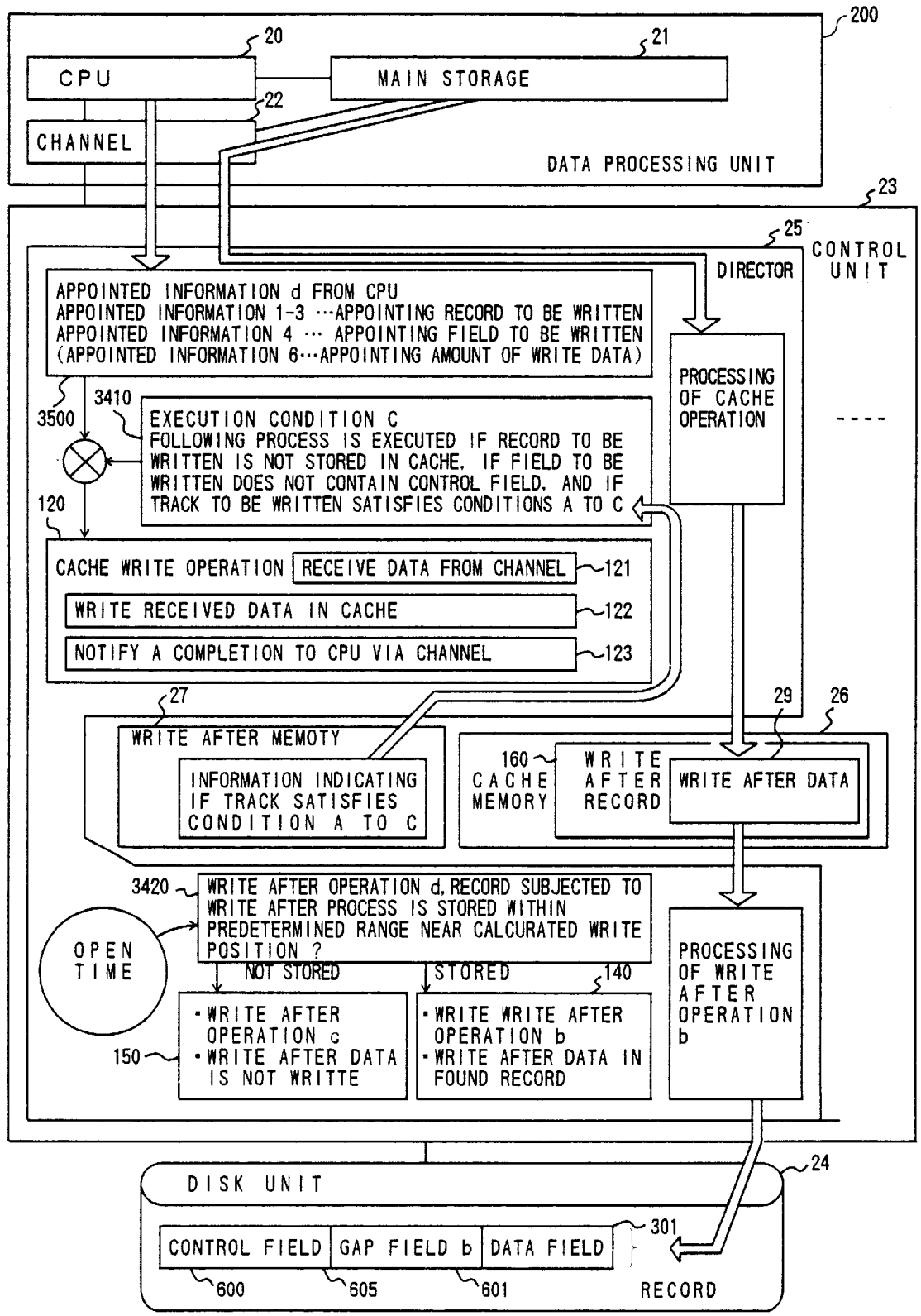
FIG. 35 is a block diagram showing the fundamental structure of a control unit 23 according to a fourth embodiment of this invention.

FIG. 35 is a detailed block diagram showing the information processing system of this embodiment. The different points from the third embodiment shown in FIG. 26 are as follows.

First, the designated information 3500 from CPU 20 does not include the designated information 7.

Second, the write-after memory 27 stores the information representative of whether or not each track 300 of the disk unit 24 satisfies the conditions A to C.

Third, the execution condition C 3410 is checked by the director using the information stored in the write-after memory 27.

The cache memory 26, directory 28, segment management information 500, track table 501, and empty segment queue head pointer 502 all have the same structure as shown in FIGS. 6, 8, 27, 10 and 11, respectively.

FIG. 36 shows the structure of the write-after memory 27 of this embodiment. The different point from the third embodiment shown in FIG. 20 is as follows. Instead of the write-after track information a 1700, there is provided write-after track information b 2800 for each disk unit 24.

FIG. 37 shows the structure of the write-after track information b 2800. The write-after track information b 2800 includes the following information provided for each track 300 of the disk unit 24.

Track state b 2900 . . . Information representative of whether or not the track 300 in concern satisfies the conditions A to C, or representative of that it is not certain whether the track 300 satisfies the conditions.

Fixed data field length information 2901 . . . Information of the length of the data field 601, the length being the same for all records 301 if the track 300 satisfies the conditions A to C.

Figure 38:
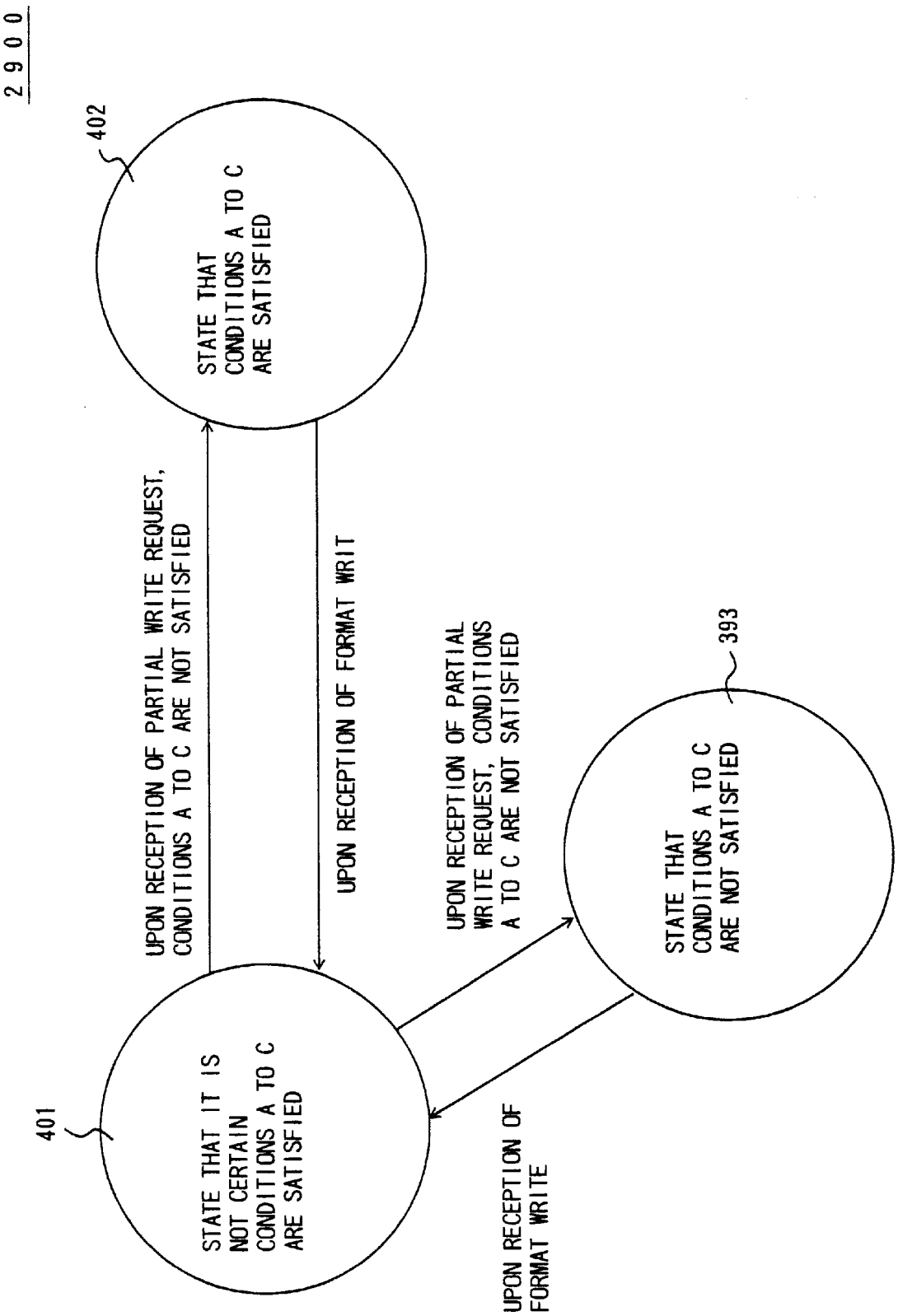
FIG. 38 is a state transition diagram of the track state b 2900 according to the fourth embodiment of this invention.

FIG. 38 shows a state transition of the track state b 2900. Transition between the states b 2900 is executed in a similar manner as the track information a 1800 of the second embodiment shown in FIG. 22. Specifically, when a partial write request is received during a state 401 that it is not certain whether the track 300 satisfies the conditions A to C, it is checked if the track 300 satisfies the conditions A to C, and the check result is stored in the track state b 2900. When a format write request is received for the track 300, the track state b 2900 is set to the state 401 that it is not certain whether the track 300 satisfies the conditions A to C.

The order of storage of the track information b 2900 and fixed data field length information 2901 is in the order of track number, similar to the track information a 1800 of the second embodiment shown in FIG. 22.

The structure of the director 25 is similar to the second embodiment shown in FIG. 23.

The process flows for the write-after schedule part 11, write-after transfer part 12, and write-after error decision part 13 are similar to those of the third embodiment shown in FIGS. 30 to 32, respectively. However, the process flows for the cache partial write part 10, write-after track information management part a 14, and write-after track information management part b 15 are different, so the description therefor will be given below.

Figure 39:
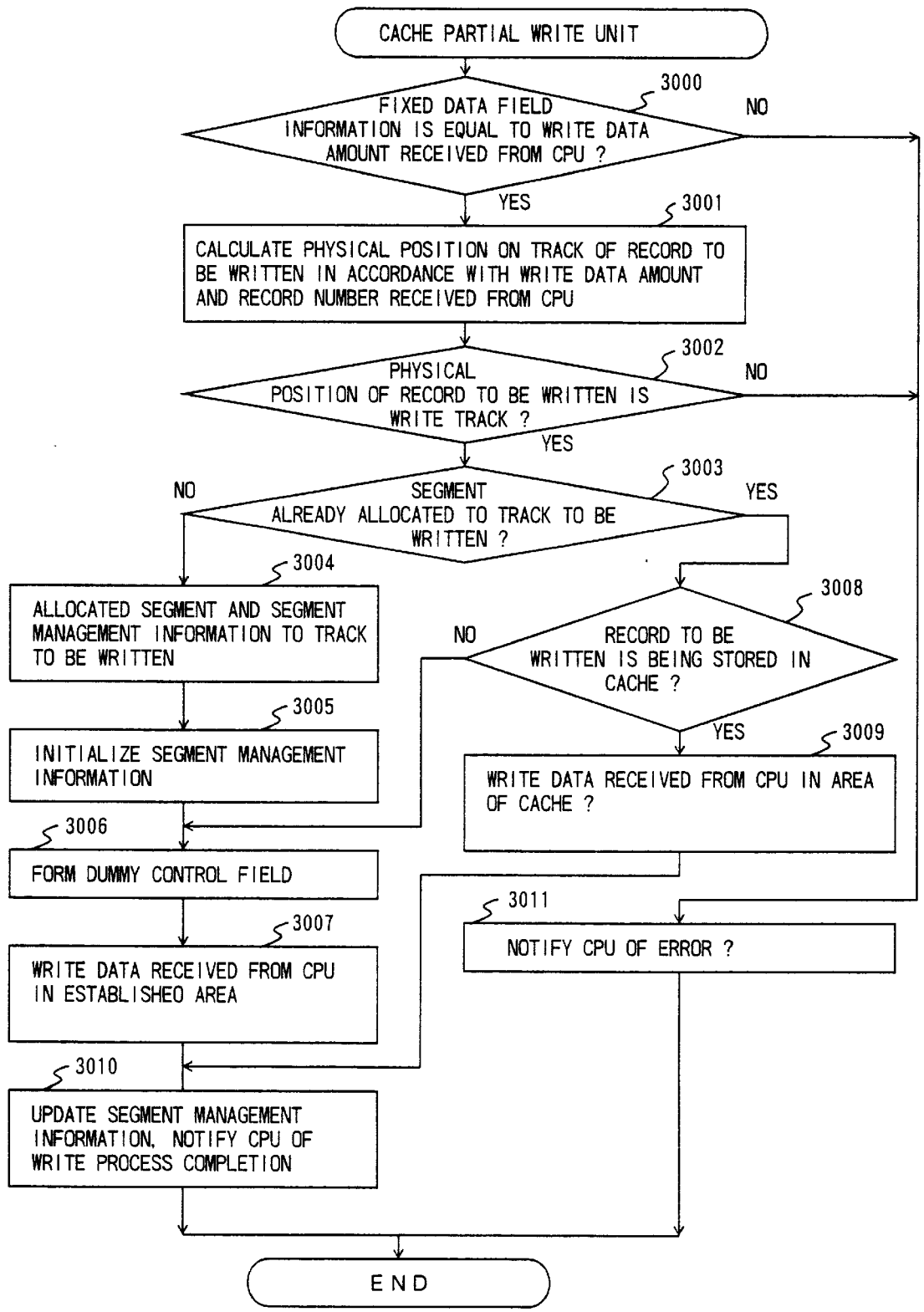
FIG. 39 is a flow chart illustrating the processes to be executed by the cache partial write part 10 according to the fourth embodiment of this invention.
Figure 40:
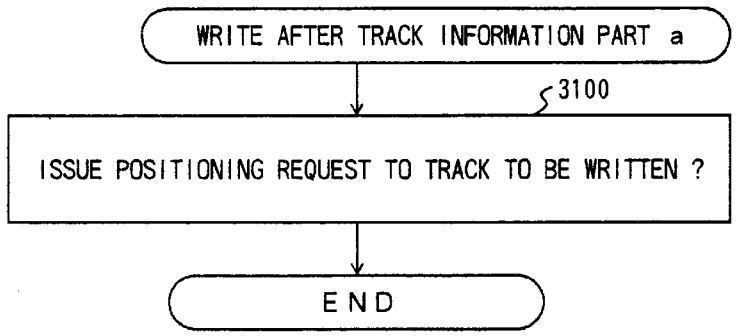
FIGS. 40A and 40B are flow charts illustrating the processes to be executed y the write-after track information management part a 14.
Figure 40:
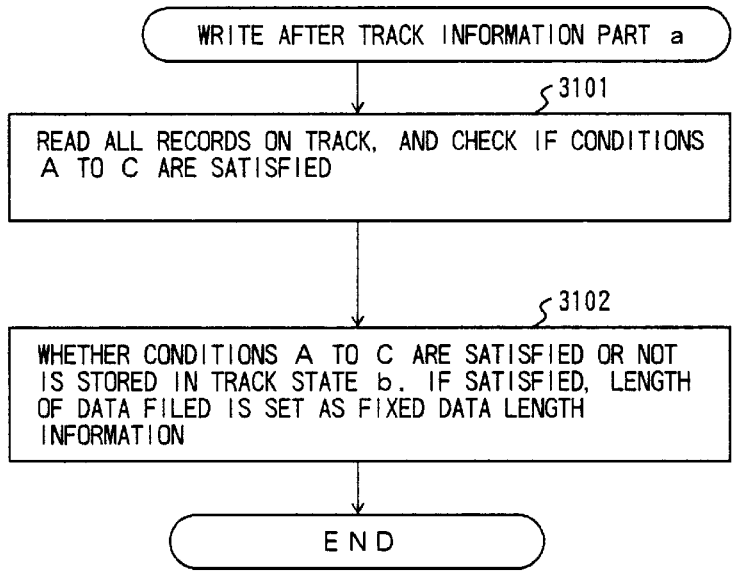

FIG. 39 is a flow chart illustrating the processes to be executed by the cache partial write part 10. Similar to the process flow of the first embodiment shown in FIG. 15, this process flow includes also a process for the case where the record 301 to be written is already stored in the cache memory 26.

This process flow is executed when the director 25 receives a partial write request from CPU 20 via the channel 22, and the track state b 2900 of the track to be written indicates the state 402 that the track satisfies the conditions A to C.

At step 3000, it is checked if the write data amount supplied from CPU 20 is valid. In this embodiment, even if the segment 400 is not allocated to the track 300 to be written, it is possible to check the validity of the write data amount from the value in the fixed data field length information 2901. If the write data amount is not valid, the process flow jumps to step 3011. If the write data amount is valid, it advances to step 3001.

The processes at step 3001 and following steps are similar to the process flow shown in FIG. 29. Namely, steps 3001 to 3007 correspond to steps 2400 to 2406 shown in FIG. 29, and steps 3008 to 3011 correspond to steps 2409 to 2412 shown in FIG. 29.

FIGS. 40A and 40B are flow charts illustrating the processes to be executed by the write-after track information management part. The different points from the process flows of the third embodiment shown in FIGS. 24A and 24B reside in that the process flows shown in FIGS. 24A and 24B deal with the write-after track information a 1700, whereas the process flows shown in FIGS. 40A and 40B deal with the write-after track information b 2800.

The process flow shown in FIG. 40A is executed at the time similar to the process flow shown in FIG. 24A.

At step 3100, there is issued a positioning request for the track 300 to be written.

The process flow shown in FIG. 40B is executed when the positioning request issued at step 3100 has been completed.

At step 3101, all records 301 on the track 300 to be written are read to check if the track satisfies the conditions A to C.

At step 3102, the check result at step 3101 is stored in the track state b 2900 for the track 300. If the conditions A to C are satisfied, the length of the data field 601 is set in the fixed data field length information 2901, to thereafter terminate the process flow.

Figure 41:
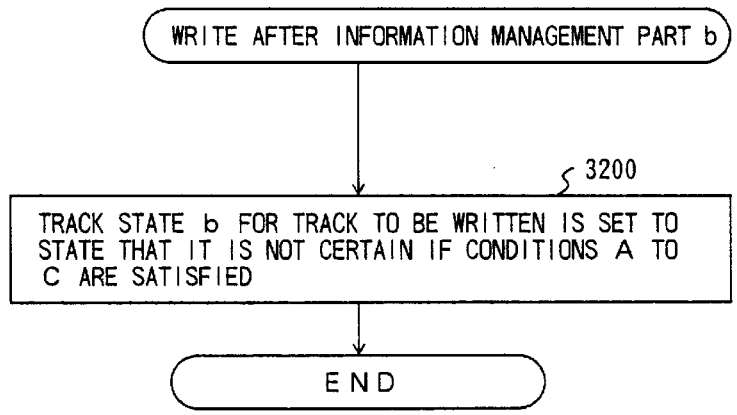
FIG. 41 is a flow chart illustrating the processes to be executed by the write-after track information management part b 15 according to the fourth embodiment of this invention.

FIG. 41 is a flow chart illustrating the processes to be executed by the write-after track information management part b 15. The difference between the process flow shown in FIG. 41 and the process flow of the third embodiment shown in FIG. 25 is that the former flow deals with the write-after track information a 1700 whereas the latter flow deals with the write-after track information b 2800.

The process flow shown in FIG. 41 is executed at the time similar to the process flow shown in FIG. 25.

At step 3200, the track state b 2900 of the track 300 to be written is reset to the state 401 that it is not certain if the track 300 satisfies the conditions A to C.

In the third and fourth embodiments, the continuity of positions of records to be stored in the cache memory 26 has not been considered at all.

However, if there is introduced a restriction that records 301 on the track 300 at physically consecutive positions should be stored in the segment also at physically consecutive positions, the cache control can be executed in a more simple manner. Such a restriction is called a consecutive storage restriction.

Figure 42:
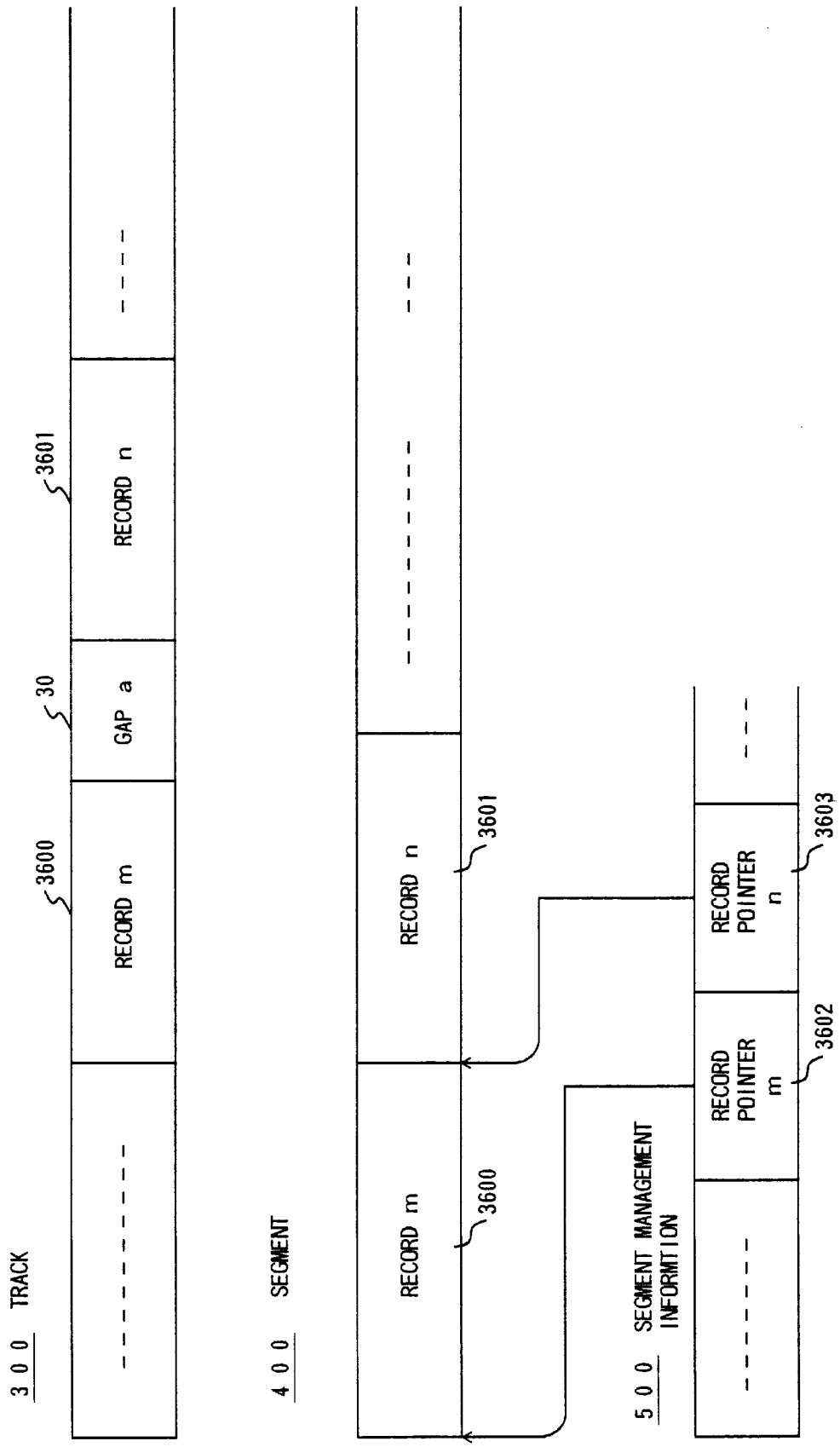
FIG. 42 shows an example of the relationship between records 301 on the track 300 at consecutive positions, and records stored in the segment 400 at consecutive positions.

For example, as shown in FIG. 42, it is assumed that a record m 3600 and a record n 3601 are present on the track 300 at physically consecutive positions. In such a case, it often occurs that CPU 20 requests to consecutively read the record m 3600 and record n 3601 on the track 300 at the physically consecutive positions. If the record m 3600 and record n 3601 are stored in the segment 400 consecutively, the director 25 is allowed to simply read a certain area in the segment 400 and send the data to CPU 20. Namely, in transferring the record n 3601 from the control unit 23 to CPU 20, it is not necessary to execute a process of referring to the record pointer n 3603 of the segment management information 500.

In order to be subject to the consecutive storage restriction, it is sufficient if the director 25 is permitted to terminate the write process when the data have been written in the cache memory 26, on condition that the following consecutive storage conditions 1 to 3 are satisfied.

Figure 43:
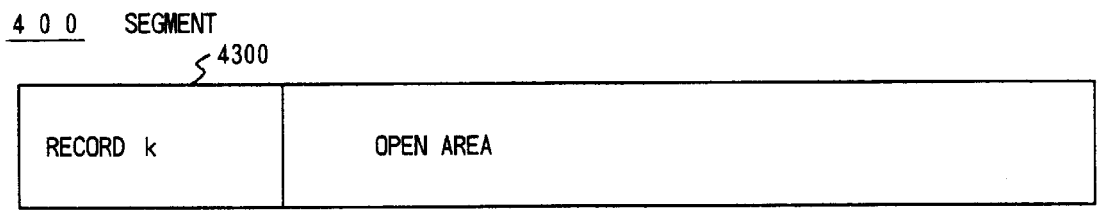
FIGS. 43A, 43B, and 43C show examples of segments 400 used for explaining the consecutive storage conditions.
Figure 43:
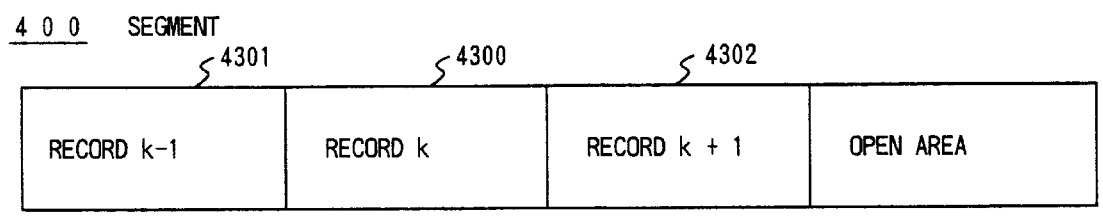
Figure 43:
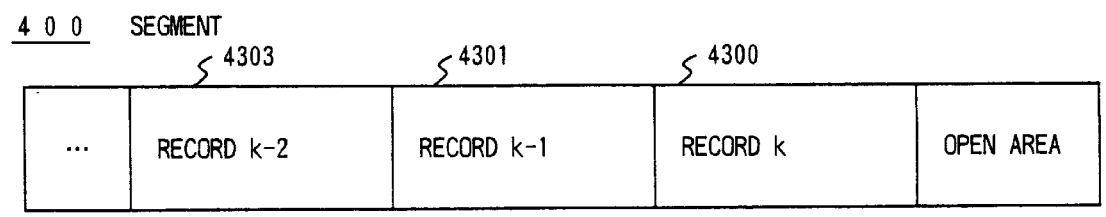

Consecutive storage condition 1 . . . The record 301 on the track 300 to be written is not being stored in the cache memory 26. The consecutive storage restriction can be met in this case because the director 25 stores a record k 4300 to be written in a newly established segment 400, as shown in FIG. 43A.

Consecutive storage condition 2 . . . The record 301 to be written is the same record 301 already stored in the cache memory 26, while meeting the consecutive storage restriction. The consecutive storage restriction can be met in this case because the data are written in an already stored record k 4300 to update the contents of the record, as shown in FIG. 43B.

Consecutive storage condition 3 . . . The record 301 to be written has a record number 602 that is larger by 1 than the maximum record number of the record 301 on the track 300 already stored in the cache memory 26. In other words, the record number 602 of the record 301 to be written is consecutive with that of the record 301 already stored in the cache memory 26. The consecutive storage restriction can be met in this case because the director 25 causes a record k 4300 to be stored in the area after the record 301 ( . . . , k-1) is already stored in the segment 400, as shown in FIG. 43C.

The consecutive storage restriction is applicable both to the case where CPU 20 supplies the information representative of whether the track 300 to be written satisfies the conditions A to C (the third embodiment) and to the case where the control unit 23 holds for each track 300 the information representative of whether the track 300 to be written satisfies the conditions A to C (the fourth embodiment). When the consecutive storage restriction is introduced, only the segment management information 500 changes.

FIG. 44 shows the structure of the segment management information 500 introducing the consecutive storage restriction according to the fifth embodiment. The different point from the third embodiment shown in FIG. 27 is that an intra-cache maximum record number 3700 is provided. This intra-cache maximum record number indicates the maximum record number 602 of records 301 stored in the cache memory 26.

The process flows shown in FIGS. 29 to 32, and FIGS. 39 to 41 are applicable to this embodiment, excepting that the process flows by the cache partial write part 10 shown in FIGS. 29 and 39 are executed at different times. Namely, the process flows are executed when the track 300 to be written satisfies the conditions A to C and the consecutive storage conditions 1 to 3.

According to the cache control method and apparatus, even if the record subjected to a partial write process is not being stored in a cache memory, it is possible to terminate the write process at the time when the data have been written in the cache memory. Accordingly, speeding up the write process using a cache memory is possible for a wide range of applications. Furthermore, the efficiency of the write process can be improved by calculating the physical position of a record.

We claim:

1. A method in a disk storage system, comprising:

a control unit connectable to a data processing unit by a channel interface; and a disk storage unit having a plurality of records accessible by said data processing unit, each of said records being a variable length record and having a data field for storing data and a control field for storing data including data indicating a length of the data field;

wherein said control unit has a cache memory storing data of some of said plurality of records of said storage unit, and performs processing, when data of one record in said disk storage unit or data to be stored in said one record in said disk storage unit is not stored in said cache memory, said method comprising the steps of:

receiving write command and write data to be stored in a data field of said one record for updating data stored in said data field of said one record without including data to be stored in a control field of said one record by using said channel interface;

writing said write data into said cache memory without accessing said disk storage unit;

performing a write operation to write said write data into said disk storage unit; and reporting a completion of said write command to said data processing unit before one of starting and completion of said write operation to said disk storage unit.

2. A method according to claim 1, including storing information in a memory of said control unit and using said information to obtain record numbers of said records in said disk storage unit.

3. A method according to claim 1, including storing information in a memory of said control unit representative of length of said data field of respective said plurality of records.

4. In a disk storage system comprising:

a control unit connectable to a data processing unit by a channel interface; and a disk storage unit having a plurality of records accessible by said data processing unit, each of said records being a variable length record and having a data field for storing data and a control field for storing data including data indicating a length of the data field; wherein said control unit has a cache memory storing data of some of said plurality of records of said storage unit, and performs processing comprising the steps of:

receiving write command and write data to be stored in a data field of one record for updating data stored in a data field of said one record not inclusive of data to be stored in a record field of said one record by using said channel interface;

writing said write data into said cache memory without transferring data of said one record from said disk storage unit when old data to be updated by said write data is not stored in said cache memory;

performing a write operation to write said write data into said disk storage unit; and reporting completion of said write command to said data processing unit before one of starting and completion of said write operation to said disk storage unit.

* * * * *